United States Patent
Okano et al.

(10) Patent No.: US 12,322,084 B2
(45) Date of Patent: Jun. 3, 2025

(54) LEARNING DATA GENERATION DEVICE AND DEFECT IDENTIFICATION SYSTEM

(71) Applicant: SEMICONDUCTOR ENERGY LABORATORY CO., LTD., Atsugi (JP)

(72) Inventors: Tatsuya Okano, Kanagawa (JP); Ryo Nakazato, Kanagawa (JP); Atsuya Tokinosu, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 319 days.

(21) Appl. No.: 17/792,758

(22) PCT Filed: Jan. 18, 2021

(86) PCT No.: PCT/IB2021/050330
§ 371 (c)(1),
(2) Date: Jul. 14, 2022

(87) PCT Pub. No.: WO2021/152416
PCT Pub. Date: Aug. 5, 2021

(65) Prior Publication Data
US 2023/0039064 A1    Feb. 9, 2023

(30) Foreign Application Priority Data
Jan. 31, 2020    (JP) .................. 2020-015382

(51) Int. Cl.
*G06K 9/00* (2022.01)
*G06T 5/50* (2006.01)
(Continued)

(52) U.S. Cl.
CPC .............. *G06T 7/0008* (2013.01); *G06T 5/50* (2013.01); *G06T 7/62* (2017.01); *G06V 10/25* (2022.01);
(Continued)

(58) Field of Classification Search
CPC ......... G06K 9/00; G06F 18/24; G06T 7/0004; G06T 7/00
(Continued)

(56) References Cited

U.S. PATENT DOCUMENTS 7,333,650 B2    2/2008    Yamamoto et al.
8,737,109 B2    5/2014    Yamazaki et al.
(Continued)

FOREIGN PATENT DOCUMENTS

CN    110189288 A    8/2019
CN    110796631 A    2/2020
(Continued)

OTHER PUBLICATIONS

Haselmann.M et al., "Supervised Machine Learning Based Surface Inspection by Synthetizing Artificial Defects", ICMLA 2017 (16th IEEE International Conference on Machine Learning and Applications), Dec. 1, 2017, pp. 390-395.
(Continued)

*Primary Examiner* — Seyed H Azarian
(74) *Attorney, Agent, or Firm* — Fish & Richardson P.C.

(57) ABSTRACT

A learning data generation device that can generate learning data suitable for learning of an identification model. The learning data generation device has a function of cutting out part of first image data as second image data, a function of generating a two-dimensional graphic corresponding to the area of the second image data and representing a pseudo defect, a function of generating third image data by combining the second image data and the two-dimensional graphic, and a function of assigning a label corresponding to the two-dimensional graphic to the third image data. By using the third image data for learning of the identification model, a highly accurate identification model can be generated.

9 Claims, 12 Drawing Sheets

(51) Int. Cl.
*G06T 7/00* (2017.01)
*G06T 7/62* (2017.01)
*G06V 10/25* (2022.01)
*G06V 10/56* (2022.01)
*G06V 10/60* (2022.01)
*G06V 10/774* (2022.01)
*G06V 20/70* (2022.01)

(52) U.S. Cl.
CPC .............. *G06V 10/56* (2022.01); *G06V 10/60* (2022.01); *G06V 10/774* (2022.01); *G06V 20/70* (2022.01); *G06T 2207/20221* (2013.01)

(58) Field of Classification Search
USPC ....... 382/100, 103, 106, 141, 145, 147, 149, 382/156, 162, 168, 173, 181, 193, 199, 382/219, 224, 260, 276, 286–291, 305, 382/312; 438/12, 25, 67
See application file for complete search history.

(56) References Cited

U.S. PATENT DOCUMENTS

| | | | |
|---|---|---|---|
| 8,953,894 | B2 | 2/2015 | Sato. et al. |
| 9,076,505 | B2 | 7/2015 | Atsumi et al. |
| 9,589,374 | B1 | 3/2017 | Gao et al. |
| 9,851,942 | B2 | 12/2017 | Kurokawa |
| 10,141,069 | B2 | 11/2018 | Ikeda et al. |
| 10,922,605 | B2 | 2/2021 | Kurokawa |
| 10,963,739 | B2 | 3/2021 | Yoshida |
| 11,132,788 | B2 | 9/2021 | Dou et al. |
| 11,170,255 | B2 * | 11/2021 | Riley ................... G06V 10/776 |
| 2005/0002560 | A1 * | 1/2005 | Yamamoto ............. G06V 10/25 382/156 |
| 2018/0322623 | A1 * | 11/2018 | Memo .................... G06N 3/084 |
| 2019/0257767 | A1 * | 8/2019 | Shaubi ................. G06T 7/0004 |
| 2019/0294923 | A1 * | 9/2019 | Riley ..................... G06F 18/24 |
| 2020/0034693 | A1 | 1/2020 | Huh et al. |
| 2020/0034956 | A1 | 1/2020 | Machek et al. |
| 2020/0402221 | A1 | 12/2020 | Ijiri |
| 2021/0027095 | A1 | 1/2021 | Kamada et al. |
| 2021/0295485 | A1 | 9/2021 | Miyazawa |
| 2022/0138983 | A1 | 5/2022 | Godo et al. |
| 2023/0329551 | A1 * | 10/2023 | Nakamura ............. A61B 3/152 |

FOREIGN PATENT DOCUMENTS

| | | |
|---|---|---|
| JP | 2004-354251 A | 12/2004 |
| JP | 2005-156334 A | 6/2005 |
| JP | 2011-214903 A | 10/2011 |
| JP | 2012-026982 | 2/2012 |
| JP | 2018-180628 A | 11/2018 |
| JP | 2018-205123 A | 12/2018 |
| KR | 2019-0100881 A | 8/2019 |
| KR | 2020-0011870 A | 2/2020 |
| TW | 201946185 | 12/2019 |
| WO | WO-2018/211891 | 11/2018 |

OTHER PUBLICATIONS

International Search Report (Application No. PCT/IB2021/050330) Dated Apr. 6, 2021.
Written Opinion (Application No. PCT/IB2021/050330) Dated Apr. 6, 2021.

* cited by examiner

LEARNING DATA GENERATION DEVICE AND DEFECT IDENTIFICATION SYSTEM

CROSS REFERENCE TO RELATED APPLICATIONS

This application is a U.S. National Phase Application under 35 U.S.C. § 371 of International Application PCT/IB2021/050330, filed on Jan. 18, 2021, which is incorporated by reference and claims the benefit of a foreign priority application filed in Japan on Jan. 31, 2020, as Application No. 2020-015382.

TECHNICAL FIELD

One embodiment of the present invention relates to a method for generating learning data. Another embodiment of the present invention relates to a learning data generation device. Another embodiment of the present invention relates to a defect identification system.

BACKGROUND ART

Visual inspection is given as a means for detecting defects in a semiconductor manufacturing process. A pattern inspection device is an example of a device for automatically performing visual inspection (visual inspection device). The visual inspection device performs defect detection and identification on obtained image data. When defect detection and identification are performed visually, the accuracy of detection and identification may vary among individuals. Furthermore, when the number of pieces of image data is large, defect detection and identification take an enormous amount of time.

In recent years, a technique of detecting and identifying defects by utilizing a neural network has been reported. For example, Patent Document 1 discloses an inspection device in which inspected signals are classified as normal and not normal on the basis of a learned first neural network and when the inspected signals are judged to be not normal, the types of defects are classified on the basis of a learned second neural network.

REFERENCE

Patent Document

[Patent Document 1] Japanese Published Patent Application No. 2012-026982

SUMMARY OF THE INVENTION

Problems to be Solved by the Invention

To improve the accuracy of judgement, classification, or the like performed on the basis of a learned neural network, a neural network needs to learn using an appropriate learning data set. An example of a method for improving the accuracy is increasing the number of pieces of learning data included in a learning data set. However, the number of defects is generally very small compared to the number of normal cases. Furthermore, to identify defects, learning data needs to be prepared for each type of defect. For these reasons, it takes an enormous amount of time and cost to increase the number of pieces of learning data.

Data augmentation (also referred to as data padding in some cases) is given as a method for increasing the number of pieces of learning data included in a learning data set. Data augmentation is a technique of increasing the number of pieces of learning data (augmenting the amount of learning data) by generating variant learning data on the basis of learning data prepared in advance. Specifically, one or more operations of horizontal and/or vertical shift, horizontal and/or vertical inversion and rotation, zooming in, and zooming out are performed on learning data prepared in advance, whereby variant learning data is generated. In machine learning for defect identification, however, such operations alone might be insufficient to improve the accuracy of defect identification.

In view of the above, an object of one embodiment of the present invention is to provide a method for generating learning data. Another object of one embodiment of the present invention is to provide a learning data generation device. Another object of one embodiment of the present invention is to provide a defect identification system.

Note that the description of these objects does not preclude the existence of other objects. One embodiment of the present invention does not have to achieve all these objects. Other objects are apparent from the description of the specification, the drawings, the claims, and the like, and other objects can be derived from the description of the specification, the drawings, the claims, and the like.

Means for Solving the Problems

One embodiment of the present invention is a learning data generation device that has a function of cutting out part of first image data that is obtained by capturing only an area with a normal pattern as second image data; a function of generating a two-dimensional graphic corresponding to the area of the second image data and representing a pseudo defect; a function of generating third image data by combining the second image data and the two-dimensional graphic; and a function of assigning a label corresponding to the two-dimensional graphic to the third image data.

Another embodiment of the present invention is a learning data generation device that has a function of cutting out part of first image data generated by combining areas not containing a defect as second image data; a function of generating a two-dimensional graphic corresponding to the area of the second image data and representing a pseudo defect; a function of generating third image data by combining the second image data and the two-dimensional graphic; and a function of assigning a label corresponding to the two-dimensional graphic to the third image data.

In the learning data generation device, the two-dimensional graphic is preferably a first two-dimensional graphic or a second two-dimensional graphic; the first two-dimensional graphic is preferably generated by specifying shape and color; and the second two-dimensional graphic is preferably generated by cutting out the second image data.

In the learning data generation device, the first two-dimensional graphic is preferably a first polygon, an ellipse, or a double ellipse; a first label is preferably assigned to the third image data generated by combining the second image data and the first polygon or the ellipse; and a second label is preferably assigned to the third image data generated by combining the second image data and the double ellipse.

In the learning data generation device, the first polygon preferably has a first vertex to an n-th (n is an integer of 3 or more and 8 or less) vertex; the length of a line segment connecting a point in the first polygon and each of the first vertex to the n-th vertex is preferably the length that follows a normal distribution; the mean of the normal distribution is preferably 0.05 times or more and 0.25 times or less the length of a long side of the second image data and the standard deviation of the normal distribution is preferably 0.2 times the mean; and each of R, G, and B of the first polygon is preferably 0 or more and 20 or less (decimal notation) when represented by 256 shades of gray; and the color of the first polygon preferably has a transmittance of 0% or more and 10% or less.

In the learning data generation device, the major diameter of the ellipse is preferably 0.05 times or more and 0.25 times or less the length of the long side of the second image data; the minor diameter of the ellipse is preferably 0.6 times or more and 1.0 times or less the major diameter; each of R, G, and B of the ellipse is preferably 0 or more and 10 or less (decimal notation) when represented by 256 shades of gray; and the color of the ellipse preferably has a transmittance of 0% or more and 10% or less.

In the learning data generation device, the major diameter of the double ellipse is preferably 0.05 times or more and 0.25 times or less the length of the long side of the second image data; the minor diameter of the double ellipse is preferably 0.6 times or more and 1.0 times or less the major diameter; the difference between the outer diameter and the inner diameter of the double ellipse is preferably 5 pixels or more and 15 pixels or less; when represented by 256 shades of gray, R of the double ellipse is preferably 150 or more and 170 or less (decimal notation), G of the double ellipse is preferably 60 or more and 80 or less (decimal notation), and B of the double ellipse is preferably 20 or more and 40 or less (decimal notation); and the color of the double ellipse preferably has a transmittance of 50% or more and 75% or less.

In the learning data generation device, the second two-dimensional graphic is preferably a second polygon; and a third label is preferably assigned to the third image data generated by combining the second image data and the second polygon.

In the learning data generation device, the second polygon is preferably a quadrangle that is cut out from the second image data that is rotated around a point positioned in the second image data at an angle of 30° or more and 150° or less; and the center of gravity of the quadrangle is preferably the point and each of a long side and a short side of the quadrangle is preferably 0.1 times or more and 0.25 times or less the length of the long side of the second image data.

The learning data generation device preferably has a function of performing gamma conversion on the third image data and a function of performing noise addition or blurring processing on the third image data.

Another embodiment of the present invention is a defect identification system that identifies a defect. The defect identification system includes the learning data generation device, a database, and an identification device. In the database, the first image data, fourth labeled image data, and fifth unlabeled image data are stored. The identification device has a function of identifying a defect contained in the fifth image data on the basis of a learned model.

In the defect identification system, the learned model is preferably generated on the basis of a learning data set composed of the third image data and the fourth image data.

Effect of the Invention

One embodiment of the present invention can provide a method for generating learning data. Another embodiment of the present invention can provide a learning data genera-tion device. Another embodiment of the present invention can provide a defect identification system.

Note that the effects of embodiments of the present invention are not limited to the effects listed above. The effects listed above do not preclude the existence of other effects. Note that the other effects are effects that are not described in this section and will be described below. The effects that are not described in this section can be derived from the descriptions of the specification, the drawings, and the like and can be extracted from these descriptions by those skilled in the art. Note that one embodiment of the present invention has at least one of the effects listed above and/or the other effects. Accordingly, depending on the case, one embodiment of the present invention does not have the effects listed above in some cases.

MODE FOR CARRYING OUT THE INVENTION

Figure 1:
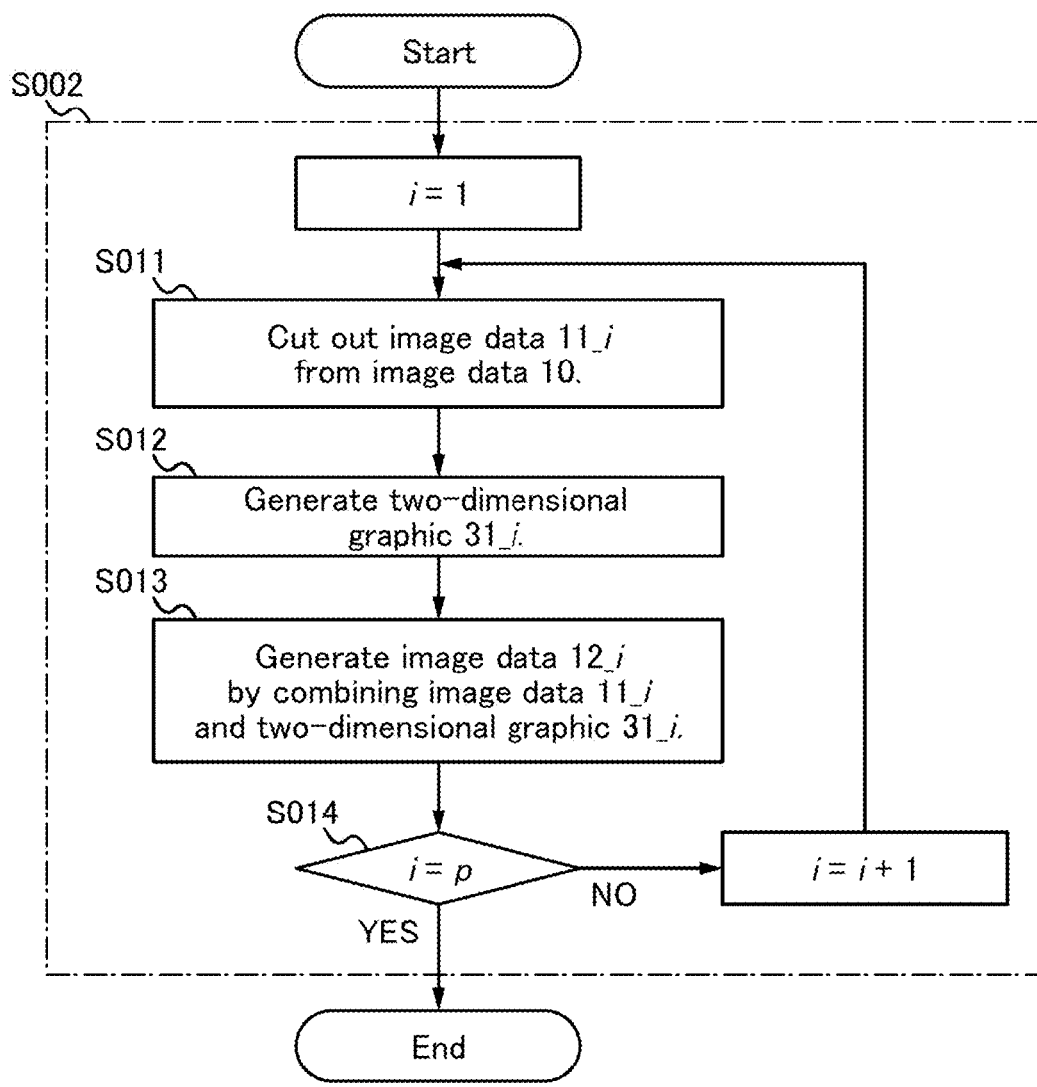
FIG. 1 is a flow chart illustrating an example of a method for generating image data.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Thus, the present invention should not be construed as being limited to the description of embodiments below.

Note that in structures of the invention described below, the same portions or portions having similar functions are denoted by the same reference numerals in different drawings, and the description thereof is not repeated.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Furthermore, ordinal numbers such as "first," "second," and "third" used in this specification are used in order to avoid confusion among components, and the terms do not limit the components numerically.

In this specification, in the case where the maximum value and the minimum value are specified, a structure in which the maximum value and the minimum value are freely combined is disclosed.

In this specification, a data set used for learning and evaluation of a machine learning model is referred to as a learning data set. In learning and evaluation of a machine learning model, the learning data set is divided into learning data (also referred to as training data) and test data (also referred to as evaluation data). In some cases, the learning data is further divided into learning data and verification data. Note that the test data may be divided from the learning data set in advance.

The learning data is data used for learning of a machine learning model. The verification data is data used for evaluation of learning results of the machine learning model. The test data is data used for evaluation of the machine learning model. In the case where machine learning is supervised learning, a label is assigned to each of the learning data, the verification data, and the test data.

Embodiment 1

In this embodiment, a method for generating learning data, a method for generating a learned identification model, and a method for identifying a defect will be described with reference to FIG. 1 to FIG. 7.

<Method for Generating Learning Data>

A method for generating learning data, which is one embodiment of the present invention, is described.

FIG. 1 is a flow chart illustrating an example of a method for generating learning data. FIG. 1 is also a flow chart explaining the flow of processing executed by a learning data generation device.

This section describes a method for generating p (p is an integer of 2 or more) pieces of learning data. Note that p may be set in advance or may be specified before a user generates learning data.

Note that generated learning data is used for learning of an identification model that will be described later. The identification model is a supervised learning model. Data input to the identification model is image data. Accordingly, the learning data generated by the above method is labeled image data. Here, p pieces of learning data are referred to as p pieces of image data 12 (image data 12_1 to image data 12_p). In other words, to each of the image data 12_1 to the image data 12_p, a label corresponding to a defect is assigned.

A method for generating the learning data (the image data 12_1 to the image data 12_p) includes Step S011 to Step S014 as illustrated in FIG. 1. Note that Step S011 to Step S014 are collectively referred to as Step S002 in some cases.

Before Step S011, image data 10 is obtained. The image data 10 is image data that is obtained by capturing only an area not containing a defect. The image data is referred to as image data not containing a defect in some cases. Alternatively, the image data 10 is image data generated by combining a plurality of areas not containing a defect.

The image data 12_1 to the image data 12_p are preferably generated in order from the image data 12_1. In Step S011 to Step S013, a method for generating image data 12_i (i is an integer of 1 or more and p or less) is described.

[Step S011]

Step S011 is a step of cutting out image data 11_i from the image data 10. This means that the image data 11_i is part of the image data 10. Note that the step of cutting out the image data 11_i from the image data 10 will be described in detail later.

[Step S012]

Step S012 is a step of generating a graphic that represents features (e.g., shape and color) of a defect in a pseudo manner (also referred to as a pseudo defect). In this embodiment, a pseudo defect is represented by a two-dimensional graphic. The two-dimensional graphic will be described in detail later. A pseudo defect generated in Step S012 is referred to as a two-dimensional graphic 31_i.

[Step S013]

Step S013 is a step of generating the image data 12_i by combining the image data 11_i and the two-dimensional graphic 31_i. An operation of combining the image data 11_i and the two-dimensional graphic 31_i is an operation of superimposing the two-dimensional graphic 31_i on the image data 11_i.

The two-dimensional graphic 31_i is generated in consideration of features of a defect. Thus, a label corresponding to a defect taken into consideration when the two-dimensional graphic 31_i is generated can be assigned to the image data 12_i.

[Step S014]

Step S014 is a step of determining whether p pieces of image data 12 have been generated. If p pieces of image data 12 have been generated (YES), generation of the image data 12 is terminated. By contrast, if less than p pieces of image data 12 have been generated (NO), the process proceeds to Step S011.

In the case where the process proceeds to Step S011, the position of image data 11_i+1 cut out from the image data 10 is preferably different from that of the image data 11_i. Defects are not always generated in the same position. Hence, image data 11 cut out from different positions are prepared, so that the accuracy of defect identification can be improved. Note that the position of the image data 11_i+1 coincides with the position of the image data 11 other than the image data 11_i in some cases.

Through the above steps, the image data 12_1 to the image data 12_p can be generated. Since a label corresponding to a defect is assigned to each of the image data 12_1 to the image data 12_p, the image data 12_1 to the image data 12_p can be used as learning data.

<Detail of Method for Generating Learning Data>

In this section, the above-described method for generating learning data will be described in detail. Note that learning data described in this section is used for, for example, learning of an identification model for identifying a defect detected in a semiconductor manufacturing process.

The image data 10 is image data that is obtained by capturing only an area where a pattern of a semiconductor film, an insulating film, or a wiring (hereinafter, simply referred to as a pattern) in a semiconductor element in the middle of the manufacturing process or a semiconductor element whose manufacturing process has been completed is normal. The image data is referred to as image data with a normal pattern in some cases. Alternatively, the image data 10 is image data generated by combining a plurality of areas with normal patterns.

A method for cutting out the image data 11_i from the image data 10 is described with reference to FIG. 2.

Figure 2:
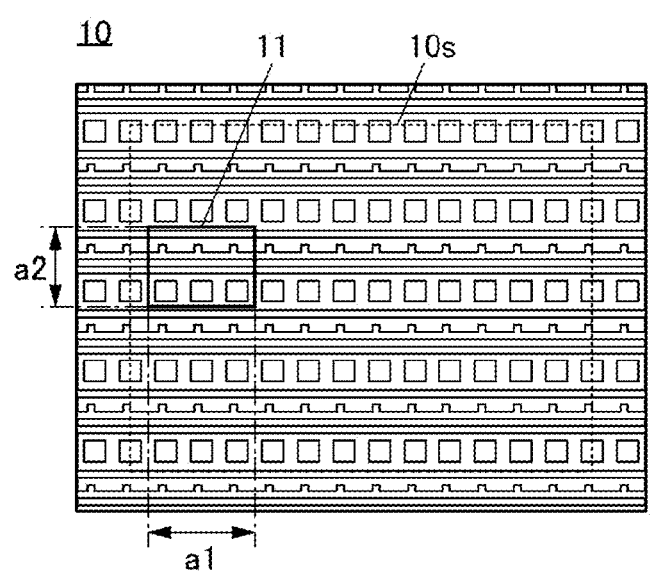
FIG. 2 is a diagram illustrating a method for cutting out image data.

FIG. 2 illustrates a method for cutting out the image data 11_i from the image data 10. In FIG. 2, the image data 11_i is referred to as the image data 11. A pattern contained in the image data 10 illustrated in FIG. 2 is a schematic pattern and does not indicate that a captured pattern of a semiconductor element is designed as illustrated in FIG. 2.

As illustrated in FIG. 2, the image data 11 is preferably a rectangle. The length of a long side of the rectangle is a1 and the length of a short side thereof is a2. The length a1 and the length a2 are specified such that the image data 11 fits into the image data 10. Accordingly, the length a1 is at least less than or equal to the length of a long side of the image data 10, and the length a2 is at least less than or equal to the length of a short side of the image data 10. In addition, the length a1 and the length a2 are specified such that a defect fits into the image data 11.

The ratio between the length a1 and the length a2 is preferably equal to the ratio between the length of the long side of the image data 10 and the length of the short side of the image data 10. In the case where the ratio between the length of the long side of the image data 10 and the length of the short side of the image data 10 is 4:3, the length a1 is preferably 640 pixels and the length a2 is preferably 480 pixels, for example.

Note that the ratio between the length a1 and the length a2 is not necessarily equal to the ratio between the length of the long side of the image data 10 and the length of the short side of the image data 10. For example, the ratio between the length a1 and the length a2 of the rectangle may be different from the ratio between the length of the long side of the image data 10 and the length of the short side of the image data 10. Alternatively, the image data 11 may be a square.

Alternatively, the long side of the rectangle may be parallel to the short side of the image data 10, and the short side of the rectangle may be parallel to the long side of the image data 10. Alternatively, the long side of the rectangle does not need to be parallel or perpendicular to the long side of the image data 10.

The position of the image data 11 is determined such that the image data 11 fits into the image data 10. Note that the position of the image data 11 may be determined with reference to the center of gravity of the image data 11 or may be determined with reference to one vertex of the image data 11. For example, the center of gravity of the image data 11 is determined by a uniform random number within a range 10s represented by a dotted line in FIG. 2. Here, a long side of the range 10s is located only a2/2 inward from the long side of the image data 10, and a short side of the range 10s is located only a1/2 inward from the short side of the image data 10. Uniform random numbers are random numbers that follow a continuous uniform distribution where all real numbers have the same probability of appearing within a specified interval or range.

Although the step of determining the position of the image data 11 after specifying the length a1 and the length a2 is described above, the step is not limited thereto. After the position of the image data 11 is specified, the length a1 and the length a2 may be determined such that the image data 11 fits into the image data 10. Alternatively, the position of the image data 11 and the lengths a1 and a2 may be determined at the same time such that the image data 11 fits into the image data 10.

The lengths of the long side and the short side of the image data 11_$i$ are preferably equal to the lengths of the long side and the short side of each of the other image data 11 (image data 11_1 to image data 11_$p$ except the image data 11_$i$). In addition, the position of the image data 11_$i$ is preferably different from at least some of the other image data 11 (the image data 11_1 to the image data 11_$p$ except the image data 11_$i$). This can improve the accuracy of defect identification as described above.

Next, the two-dimensional graphic 31_$i$ will be described in detail.

Examples of defects detected in a semiconductor manufacturing process include contamination with foreign matter, film loss, a defective pattern, a film residue, film floating, and disconnection. These defects have different features such as shape and color. Thus, the features such as shape and color of the two-dimensional graphic need to be different for each defect.

In this embodiment, an example of identifying typical defects such as contamination with foreign matter, film loss, and a defective pattern is described. Note that contamination with foreign matter refers to a defect caused when foreign matter originating from workers, materials, manufacturing apparatuses, work environment, or the like is attached onto a substrate (e.g., a semiconductor substrate such as a silicon wafer, a glass substrate, a plastic substrate, a metal substrate, or an SOI substrate). Film loss refers to a defect caused when a normal pattern peels off. A defective pattern refers to a defect caused when a pattern is not formed as designed.

As described above, the defective pattern is a defect in which a pattern is not formed as designed. Thus, a two-dimensional graphic representing a defective pattern is preferably generated by cutting out the image data 10. Meanwhile, foreign matter is a defect that is unintentionally mixed in. Film loss is a defect in which a normal pattern peels off. Accordingly, the foreign matter and the film loss have a shape and a color that are unrelated to the pattern. Thus, two-dimensional graphics representing foreign matter and film loss are preferably generated by specifying the shape and color.

Thus, in consideration of features such as a shape and a color of each of foreign matter, film loss, and a defective pattern, a two-dimensional graphic representing foreign matter is an ellipse or a first polygon; a two-dimensional graphic representing film loss is a double ellipse; and a two-dimensional graphic representing a defective pattern is a second polygon.

With reference to FIG. 3A to FIG. 3E, the two-dimensional graphic 31_$i$ (the ellipse, the first polygon, the double ellipse, or the second polygon) that is generated in Step S012 will be described in detail below.

<<Ellipse>>

Examples of shape, color, and position of the ellipse representing foreign matter are described with reference to FIG. 3A.

Figure 3A:
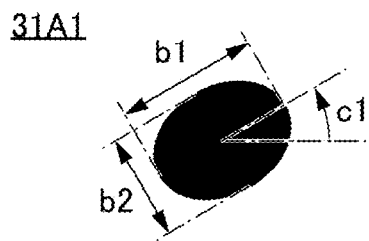
FIG. 3A to FIG. 3E are diagrams illustrating two-dimensional graphics.

An ellipse 31A1 representing foreign matter is illustrated in FIG. 3A. The length of a major axis (major diameter) of the ellipse 31A1 is b1 and the length of a minor axis (minor diameter) thereof is b2.

The major diameter b1 of the ellipse 31A1 is 0.025 times or more and 0.4 times or less, preferably 0.05 times or more and 0.25 times or less the length a1 of the long side of the image data 11. Specifically, the major diameter b1 is preferably a value determined by a uniform random number that falls within the range of 0.05 a1 or more and 0.25 a1 or less.

The minor diameter b2 of the ellipse 31A1 is 0.5 times or more and 1.0 times or less, preferably 0.6 times or more and 1.0 times or less the major diameter b1 of the ellipse 31A1. Specifically, the minor diameter b2 is preferably determined by a uniform random number that falls within the range of 0.6 b1 or more and 1.0 b1 or less.

In the case where the major diameter b1 and the minor diameter b2 are equal, the ellipse 31A1 is a circle (perfect circle). Therefore, a circle (perfect circle) is also included in the shape of the ellipse 31A1.

An angle formed between a line parallel to the long side of the image data 11 and the major axis of the ellipse 31A1 is referred to as a rotation angle c1 of the ellipse 31A1. The rotation angle c1 is preferably determined by a uniform random number that falls within the range of, for example, greater than or equal to 0° and less than 360°.

The color of the ellipse 31A1 is preferably close to the color of detected foreign matter. For example, the color of the ellipse 31A1 is preferably black or a color close to black. Specifically, in the case where the color is represented by mixing R (red), G (green), and B (blue) each of which is represented by 256 shades of gray (8 bits), each of R, G, and B of the ellipse 31A1 is 0 or more and 40 or less (decimal notation), preferably 0 or more and 20 or less (decimal notation).

Detected foreign matter often has a low light-transmitting property. For this reason, the color of the ellipse 31A1 preferably has low transmittance. The color of the ellipse 31A1 has a transmittance of, for example, 0% or more and 20% or less, preferably 0% or more and 10% or less.

The ellipse 31A1 is preferably generated such that the above is satisfied.

Note that the ellipse 31A1 is not limited to the shapes given above and may have an egg shape, an oval shape, or the like. In the case where the ellipse 31A1 has an egg shape, an oval shape, or the like, the ellipse 31A1 preferably has a shape similar to those given above.

The position of the ellipse 31A1 is preferably determined by a uniform random number such that the whole ellipse 31A1 fits into the image data 11.

<<First Polygon>>

Examples of shape, color, and position of the first polygon representing foreign matter are described with reference to FIG. 3B.

Figure 3B:
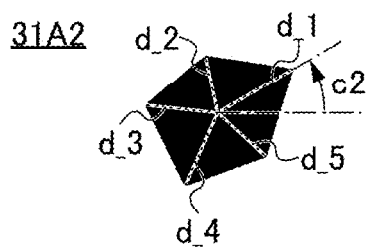

A first polygon 31A2 representing foreign matter is illustrated in FIG. 3B.

The number of sides of the first polygon 31A2 is randomly determined by an integer of 3 or more and 8 or less. Here, the number of sides of the first polygon 31A2 is n (n is an integer of 3 or more and 8 or less). Note that the number of sides of the first polygon 31A2 in this specification is equal to the number of vertices of the first polygon 31A2. In other words, the first polygon 31A2 is a polygon with n vertices and is an n-gon. Note that the first polygon 31A2 is illustrated as a pentagon in FIG. 3B.

The vertices of the first polygon 31A2 are referred to as a first vertex to an n-th vertex. A line connecting a point in the first polygon 31A2 and a k-th (k is an integer of 1 or more and n or less) vertex is referred to as a k-th line segment. Here, an angle formed between adjacent line segments (an angle formed between the k-th line segment and a (k+1)-th line segment; in the case where k is n, an angle formed between an n-th line segment and a first line segment) is 360/n[°]. Note that the angle formed between adjacent line segments is not limited thereto. For example, the angle may be determined by a normal random number. The mean of a normal distribution that the normal random number follows is, for example, 360/n[°]. The standard deviation of the normal distribution that the normal random number follows is, for example, 0.1 times or more and 0.3 times or less, preferably 0.2 times the mean.

The length of the k-th line segment is denoted by d_k. Length d_1 to length d_n are each determined by a random number (also referred to as normal random number) that follows a normal distribution. The mean of the normal distribution is, for example, 0.025 times or more and 0.4 times or less, preferably 0.05 times or more and 0.25 times or less the length a1 of the long side of the image data 11. Specifically, the mean is determined by a uniform random number that falls within the range of 0.05 a1 or more and 0.25 a1 or less. The standard deviation of the normal distribution is, for example, 0.1 times or more and 0.3 times or less, preferably 0.2 times the mean.

An angle formed between a line parallel to the long side of the image data 11 and a line segment (a first line segment) connecting the point and the first vertex is referred to as a rotation angle c2 of the first polygon 31A2. Note that the rotation angle c2 may be an angle formed between the line parallel to the long side of the image data 11 and a line segment connecting the point and any one of the second vertex to the n-th vertex (any one of a second line segment to the n-th line segment). The rotation angle c2 is a value determined by a uniform random number that falls within the range of, for example, greater than or equal to 0° and less than 360°.

The color of the first polygon 31A2 is preferably close to the color of detected foreign matter. For example, the color of the first polygon 31A2 is preferably black or a color close to black. Specifically, in the case where the color is represented by mixing R, G, and B each of which is represented by 256 shades of gray, each of R, G, and B of the first polygon 31A2 is 0 or more and 40 or less (decimal notation), preferably 0 or more and 20 or less (decimal notation).

Detected foreign matter often has a low light-transmitting property. For this reason, the color of the first polygon 31A2 preferably has low transmittance. The color of the first polygon 31A2 has a transmittance of, for example, 0% or more and 20% or less, preferably 0% or more and 10% or less.

The first polygon 31A2 is preferably generated such that the above is satisfied.

The position of the first polygon 31A2 is preferably determined by a uniform random number such that the whole first polygon 31A2 fits into the image data 11.

<<Double Ellipse>>

Examples of shape, color, and position of the double ellipse representing film loss are described with reference to FIG. 3C.

Figure 3C:
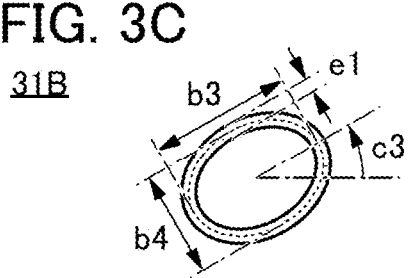

A double ellipse 31B representing film loss is illustrated in FIG. 3C. An ellipse represented by a dotted line in FIG. 3C is a curved line drawn by connecting points whose distance to an outer ellipse of the double ellipse 31B is equal to the distance to an inner ellipse of the double ellipse 31B. The major diameter of the ellipse represented by the dotted line in FIG. 3C is b3 and the minor diameter thereof is b4. Here, the major diameter of the double ellipse 31B is denoted by b3, the minor diameter thereof is denoted by b4, and the width of the double ellipse 31B (the distance between the outer ellipse and the inner ellipse) is denoted by e1.

The major diameter b3 of the double ellipse 31B is 0.025 times or more and 0.4 times or less, preferably 0.05 times or more and 0.25 times or less the length a1 of the long side of the image data 11. Specifically, the major diameter b3 is a value determined by a uniform random number that falls within the range of 0.05 a1 or more and 0.25a1 or less.

The minor diameter b4 of the double ellipse 31B is 0.5 times or more and 1.0 times or less, preferably 0.6 times or more and 1.0 times or less the major diameter b3 of the double ellipse 31B. Specifically, the minor diameter b4 of the double ellipse 31B is a value determined by a uniform random number that falls within the range of 0.6 b3 or more and 1.0 b3 or less.

In the case where the major diameter b3 and the minor diameter b4 are equal, the double ellipse 31B is a double circle (perfect double circle). Therefore, a double circle (perfect double circle) is also included in the shape of the double ellipse 31B.

An angle formed between a line parallel to the long side of the image data 11 and the major axis of the double ellipse 31B is referred to as a rotation angle c3 of the double ellipse 31B. The rotation angle c3 is preferably determined by a uniform random number that falls within the range of, for example, greater than or equal to 0° and less than 360°.

The width e1 of the double ellipse 31B is 3 pixels or more and 25 pixels or less, preferably 5 pixels or more and 15 pixels or less.

The color of the double ellipse 31B is preferably close to the color of detected film loss. Specifically, in the case where the color is represented by mixing R, G, and B each of which is represented by 256 shades of gray, R of the double ellipse 31B is 140 or more and 180 or less (decimal notation), preferably 150 or more and 170 or less (decimal notation); G is 50 or more and 90 or less (decimal notation), preferably 60 or more and 80 or less (decimal notation); and B is 10 or more and 30 or less (decimal notation), preferably 20 or more and 40 or less (decimal notation).

Detected film loss often has a light-transmitting property. For this reason, the color of the double ellipse 31B preferably has a medium level of transmittance. The color of the double ellipse 31B has a transmittance of, for example, 40% or more and 85% or less, preferably 50% or more and 75% or less.

The double ellipse 31B is preferably generated such that the above is satisfied.

Note that the double ellipse 31B is not limited to the shapes given above and may be a region surrounded by two egg shapes or a region surrounded by two ovals. Alternatively, the double ellipse 31B may be a region surrounded by two graphics with different shapes. For example, the double ellipse 31B may be a region surrounded by two graphics selected from an ellipse, an egg shape, an oval, and the like. In the case where the shape of the double ellipse 31B is the region given above, the double ellipse 31B preferably has a shape similar to those given above.

The position of the double ellipse 31B is determined by a uniform random number such that the whole double ellipse 31B fits into the image data 11.

<<Second Polygon>>

Examples of a method for generating a second polygon representing a defective pattern and a position thereof are described with reference to FIG. 3D and FIG. 3E.

First, a method for generating a second polygon 31C representing a defective pattern is described.

First, coordinates P are determined. The coordinates P are determined by uniform random numbers that fall within a range 1 is illustrated in FIG. 3D. Here, the range 11s is a range of the image data 11 except a certain width from the end portion. Here, assuming that the certain width is e2, e2 is preferably 8 pixels or more and 12 pixels or less, further preferably 10 pixels.

Figure 3D:
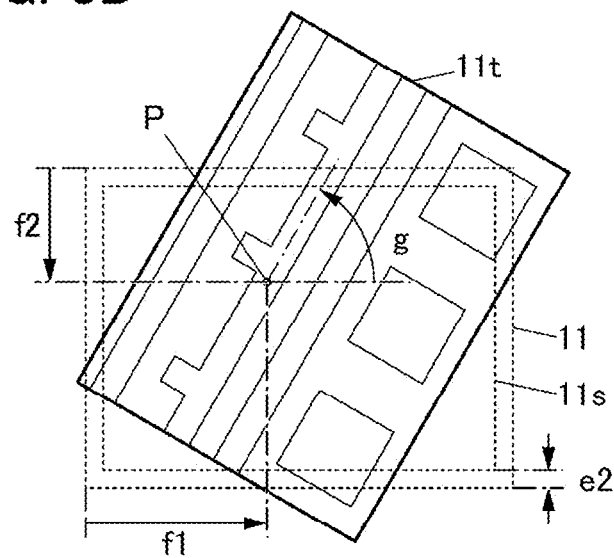
Figure 3E:
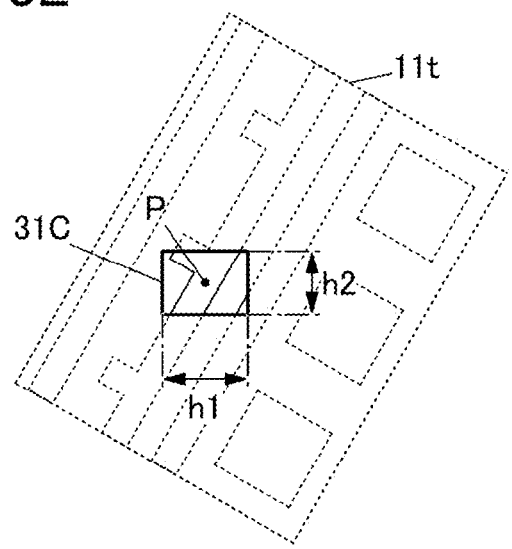

In FIG. 3D, the minimum length from one of the short sides of the image data 11 to the coordinates P is denoted by f1, and the minimum length from one of the long sides of the image data 11 to the coordinates P is denoted by f2.

Next, the image data 11 is rotated by an angle g around the coordinates P. The angle g is preferably determined with reference to a line parallel to the long side of the image data 11. The angle g is determined by a uniform random number that falls within the range of 30° or more and 150° or less.

Although the angle g is shown counterclockwise in FIG. 3D, it may be clockwise. The image data 11 is rotated by the angle g to obtain image data 11t.

A quadrangle whose center of gravity is positioned at the coordinates P is cut out from the image data 11t. The cut out quadrangle is the second polygon 31C (see FIG. 3E). The length of a long side of the second polygon 31C is h1 and the length of a short side thereof is h2.

The length h1 of the long side of the second polygon 31C is 0.025 times or more and 0.4 times or less, preferably 0.1 times or more and 0.25 times or less the length a1 of the long side of the image data 11. Specifically, the length h1 is a value determined by a uniform random number that falls within the range of 0.1 a1 or more and 0.25a1 or less.

The length h2 of the short side of the second polygon 31C is 0.025 times or more and 0.4 times or less, preferably 0.1 times or more and 0.25 times or less the length a1 of the long side of the image data 11. Specifically, the length h2 is a value determined by a uniform random number that falls within the range of 0.1 a1 or more and 0.25a1 or less.

A detected defective pattern tends to be larger than detected foreign matter. Thus, specifying the length h1 and the length h2 as described above enables the second polygon 31C close to a detected defective pattern to be generated.

The lengths f1, f2, h1, and h2 are preferably determined such that the second polygon 31C does not extend beyond the image data 11t. Accordingly, in the case where the second polygon 31C with the determined lengths f1, f2, h1, and h2 extends beyond the image data 11t, the lengths f1, f2, h1, and h2 are each preferably determined repeatedly by a uniform random number until the second polygon 31C no longer extends beyond the image data 11t.

In the above-described manner, the second polygon 31C can be generated.

Although the quadrangle is cut out such that the long side of the second polygon 31C becomes parallel to the long side of the image data 11 in the above-described method, one embodiment of the present invention is not limited thereto. The long side of the second polygon 31C is not necessarily parallel to the long side of the image data 11.

Furthermore, although the quadrangle is described as an example of the second polygon 31C in the above-described method, one embodiment of the present invention is not limited thereto. The second polygon 31C may be, for example, a triangle, a pentagon or a polygon with more vertices, or an ellipse. In the case where the second polygon 31C is a triangle, a pentagon or a polygon with more vertices, or an ellipse, the second polygon 31C preferably has a shape similar to those given above.

The second polygon 31C is positioned such that the center of gravity of the second polygon 31C coincides with the coordinates P. Note that the position of the second polygon 31C is not limited thereto and may be determined by a uniform random number such that the whole second polygon 31C fits into the image data 11.

In the above-described manner, the two-dimensional graphic 31_i can be generated. Since the two-dimensional graphic 31_i is generated in consideration of features of defects, the use of the two-dimensional graphic 31_i allows suitable data augmentation.

As described above, parameters related to the size (area) of the two-dimensional graphic 31_i (e.g., the major diameter b1 of the ellipse 31A1, the length d_k of the k-th line segment of the first polygon 31A2, the major diameter b3 of the double ellipse 31B, or the length h1 of the long side of the second polygon 31C) are determined with reference to the length of the long side of the image data 11 and/or the length of the short side of the image data 11. In other words, the size (area) of the two-dimensional graphic 31_*i* corresponds to the size (area) of the image data 11.

Defects detected in a semiconductor manufacturing process include a film residue, film floating, and disconnection as well as the aforementioned defects (contamination with foreign matter, film loss, and a defective pattern). In the case where these defects are subjected to identification, two-dimensional graphics suitable for these defects are preferably generated.

Next, the image data 12 (any of the image data 12_1 to the image data 12_*p*) will be described.

Figure 4A:
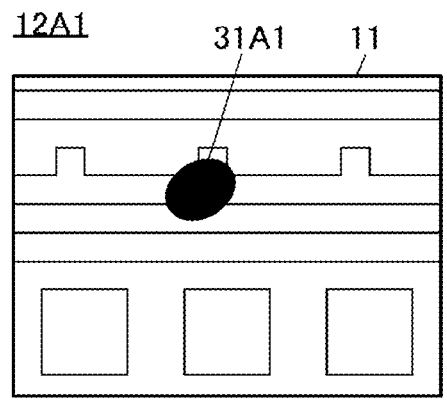
FIG. 4A to FIG. 4D are diagrams illustrating image data.
Figure 4B:
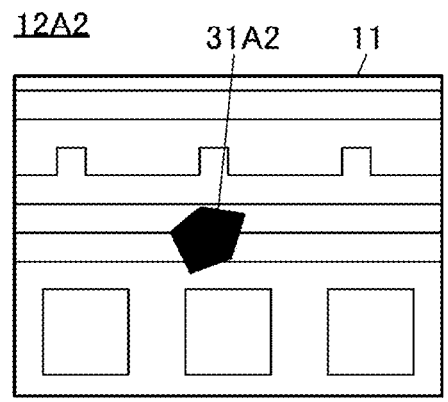
Figure 4C:
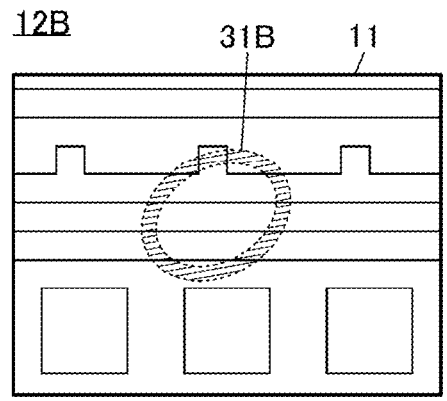
Figure 4D:
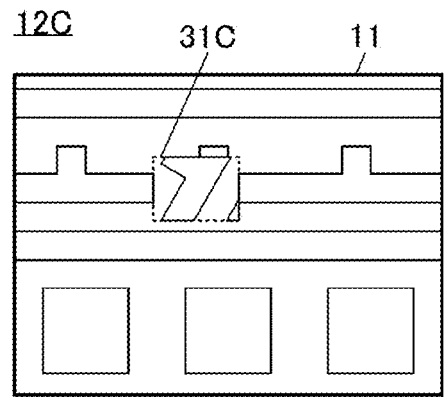

FIG. 4A to FIG. 4D are diagrams illustrating the image data 12. FIG. 4A illustrates image data 12A1 that is generated by combining the image data 11 and the ellipse 31A1. FIG. 4B illustrates image data 12A2 that is generated by combining the image data 11 and the first polygon 31A2. FIG. 4C illustrates image data 12B that is generated by combining the image data 11 and the double ellipse 31B. FIG. 4D illustrates image data 12C that is generated by combining the image data 11 and the second polygon 31C.

As described above, a label corresponding to the two-dimensional graphic 31_*i* is assigned to the image data 12_*i*. For example, in the case where the two-dimensional graphic 31_*i* is the ellipse 31A1 or the first polygon 31A2, a label corresponding to foreign matter is assigned to the image data 12_*i*. Alternatively, in the case where the two-dimensional graphic 31_*i* is the double ellipse 31B, a label corresponding to film loss is assigned to the image data 12_*i*. Further alternatively, in the case where the two-dimensional graphic 31_*i* is the second polygon 31C, a label corresponding to a defective pattern is assigned to the image data 12_*i*.

Specifically, a label corresponding to foreign matter is assigned to each of the image data 12A1 illustrated in FIG. 4A and the image data 12A2 illustrated in FIG. 4B. A label corresponding to film loss is assigned to the image data 12B illustrated in FIG. 4C. A label corresponding to a defective pattern is assigned to the image data 12C illustrated in FIG. 4D.

The above has described in detail the method for generating learning data.

<Another Example of Method for Generating Learning Data>

Figure 5:
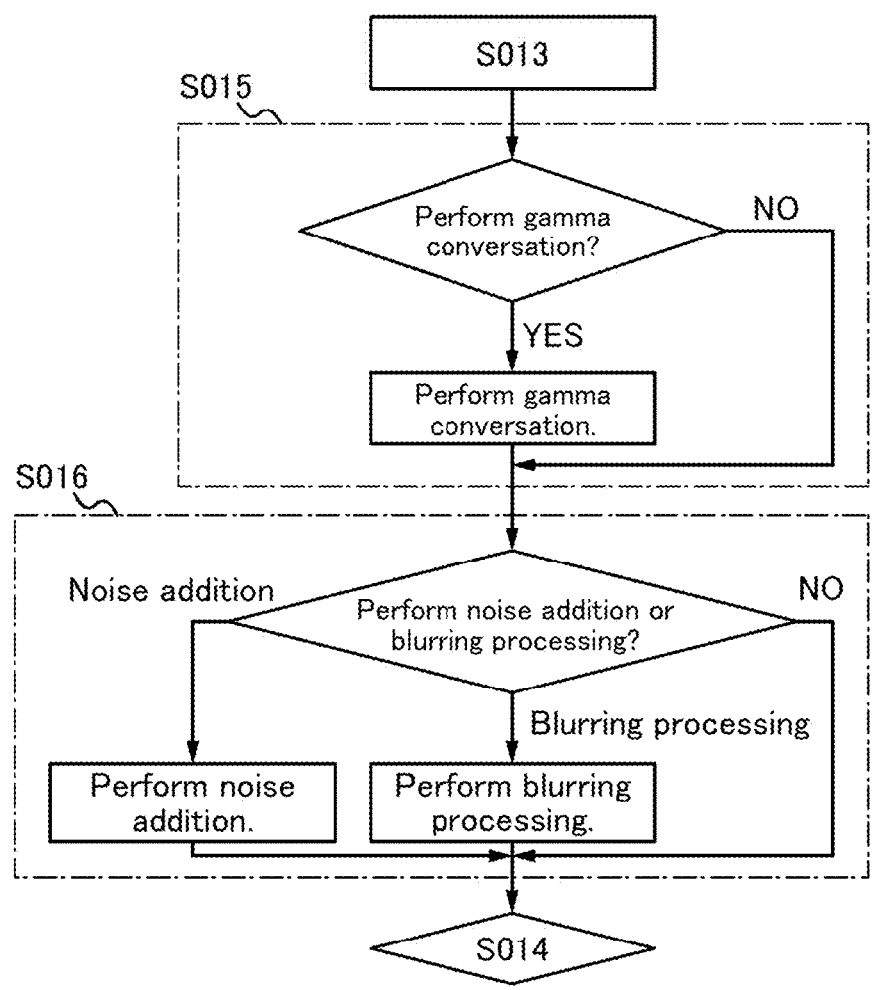
FIG. 5 is a flow chart illustrating an example of a method for generating image data.

The method for generating learning data is not limited to the method described above. For example, as illustrated in FIG. 5, the method for generating learning data may include Step S015 and Step S016 between Step S013 and Step S014 illustrated in FIG. 1.

[Step S015]

Step S015 is a step of determining whether or not gamma conversion is performed on the image data 12_. Gamma conversion is an operation to adjust the brightness of an image and to convert the brightness values of pixels of image data with an exponential function.

In the case where gamma conversion is determined to be performed (Step S015: YES), gamma conversion is performed on the image data 12_*i*. By contrast, in the case where gamma conversion is determined not to be performed (Step S015: NO), gamma conversion is not performed on the image data 12_*i*.

Note that contrast adjustment may be performed instead of gamma conversion. Alternatively, gamma conversion and contrast adjustment may be randomly selected for each of the image data 12_1 to the image data 12_*p*.

[Step S016]

Step S016 is a step of determining whether or not noise addition or blurring processing is performed on the image data 12_1.

Noise addition is an operation to add variable components (noise) that appear randomly to image data. Examples of noise to be added include noise based on Gaussian distribution (also referred to as Gaussian noise) and noise that is position independent and appears randomly with a certain frequency (also referred to as impulse noise).

Blurring processing is an operation to blur outlines or color boundaries by filtering. Examples of a filter used in the blurring processing include an averaging filter and a Gaussian filter. The blurring processing may be performed on the whole or part of the image data 12_1.

In the case where noise addition is determined to be performed, noise addition is performed on the image data 12_*i*. In the case where blurring processing is determined to be performed, blurring processing is performed on the image data 12_*i*. In the case where neither noise addition nor blurring processing is determined to be performed (Step S016: NO), neither noise addition nor blurring processing is performed on the image data 12_1.

The above has described the method for generating learning data. Accordingly, data augmentation can be performed in consideration of features of defects. Learning data generated by the method is added to a learning data set used for learning of an identification model. This enables an identification model with high accuracy of defect identification to be provided.

<Method for Generating Learned Identification Model>

A method for generating a learned identification model, which is one embodiment of the present invention, is described.

Figure 6:
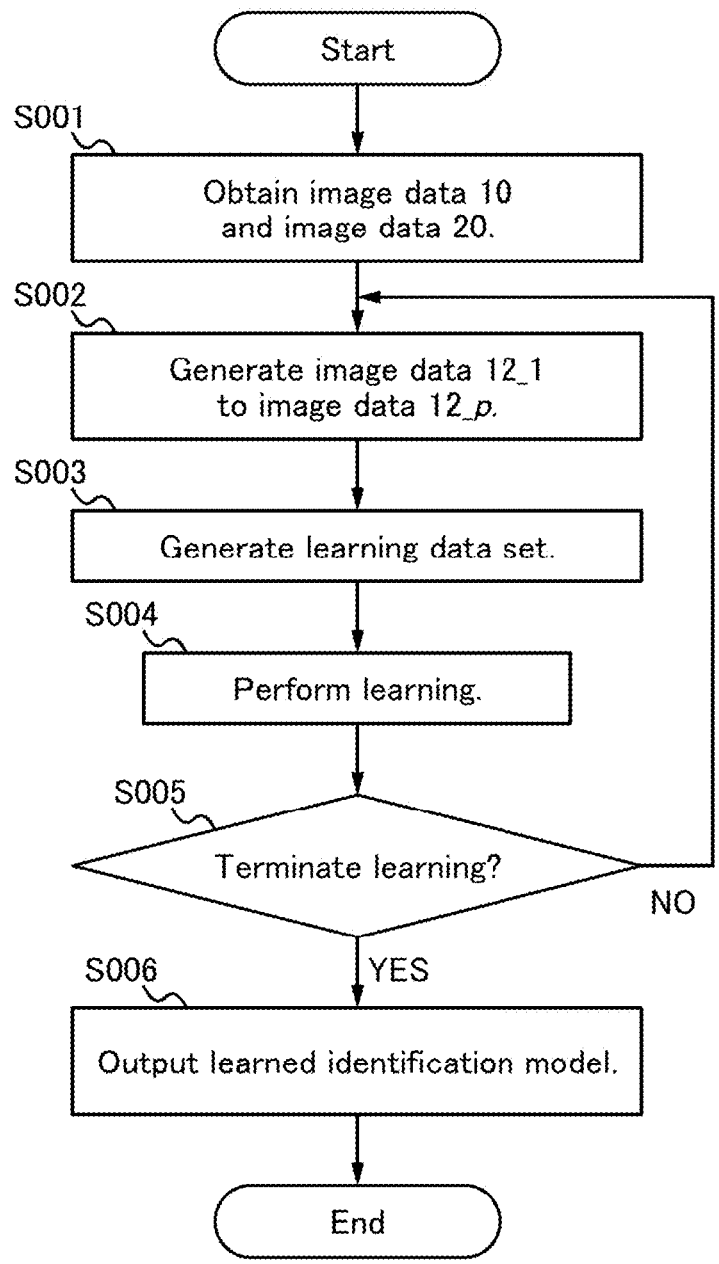
FIG. 6 is a flow chart illustrating an example of a method for generating a learned identification model.

FIG. 6 is a flow chart illustrating an example of a method for generating a learned identification model. FIG. 6 is also a flow chart explaining the flow of processing executed by a learning data generation device. Note that the flow chart of FIG. 6 includes the aforementioned method for generating learning data.

The method for generating a learned identification model includes Step S001 to Step S006 as illustrated in FIG. 6.

[Step S001]

Step S001 is a step of obtaining the image data 10 and a plurality of pieces of image data 20.

As described above, the image data 10 is image data not containing a defect or image data generated by combining a plurality of areas not containing a defect. Furthermore, the image data 10 is image data with a normal pattern or image data generated by combining a plurality of areas with normal patterns.

Each of the plurality of pieces of image data 20 (image data 20_1 to image data 20_*q* (q is an integer of 2 or more) is image data containing a defect. Note that a label corresponding to a defect contained in image data 20_*j* (j is an integer of 1 or more and q or less) is assigned to the image data 20_*j*. In other words, the plurality of pieces of image data 20 is image data that can be used as learning data, verification data, or test data.

[Step S002]

Step S002 is a step of generating p pieces of image data 12 (the image data 12_1 to the image data 12_*p*). Step S002 includes Step S011 to Step S014 illustrated in FIG. 1. The description of <method for generating learning data> can be referred to for Step S011 to Step S014.

It is preferable that a substantially equal number of pieces of image data 12 be generated for each defect. For example, the number of pieces of image data 12 to which a label corresponding to foreign matter is assigned, the number of pieces of image data 12 to which a label corresponding to film loss is assigned, and the number of pieces of image data 12 to which a label corresponding to a defective pattern is assigned are preferably substantially equal. This can suppress overfitting (overlearning) for a specific defect.

Specifically, a two-dimensional graphic 31_1 to a two-dimensional graphic 31_p are each preferably determined to be any of the ellipse 31A1, the first polygon 31A2, the double ellipse 31B, and the second polygon 31C by a uniform random number.

Alternatively, the two-dimensional graphic 31_1 to the two-dimensional graphic 31_p may be generated such that the sum of the number of generated ellipses 31A1 and the number of generated first polygons 31A2, the number of generated double ellipses 31B, and the number of generated second polygons 31C are equal.

[Step S003]

Step S003 is a step of generating a learning data set.

Input data of a learning data set is the plurality of pieces of image data 20 and p pieces of image data 12 generated in Step S002. In other words, the input data is the image data 20_1 to the image data 20_q and the image data 12_1 to the image data 12_p.

A correct label of the learning data set is a label assigned to each of the image data 20_1 to the image data 20_q and a label assigned to each of the image data 12_1 to the image data 12_p.

Through the above steps, the learning data set is composed of (q+p) pieces of image data.

[Step S004]

Step S004 is a step of performing learning of an identification model using the learning data set generated in Step S003.

It is preferable to use a convolutional neural network (CNN) as the identification model. Examples of CNN include VGG16, GoogLeNet, and ResNet.

In learning of the identification model, the learning data set is preferably divided into learning data, verification data, and test data. For example, learning of the identification model is performed using the learning data, the learning results are evaluated using the verification data, and the learned identification model is evaluated using the test data. This allows the accuracy of the learned identification model to be verified. Hereinafter, the ratio of the number of correct identification results to the number of pieces of test data might be referred to as an accuracy rate.

Note that the test data is composed of some pieces of the image data 20_1 to the image data 20_q. The verification data is composed of some pieces of the image data 20 that are not used for the test data. The learning data is composed of the image data 12_1 to the image data 12_p and the image data 20 that is not used for either the test data or the verification data. The test data composed of only the image data containing a defect enables evaluation of the accuracy of identification of a defect contained in unlabeled image data.

Examples of a method for dividing a learning data set into learning data, verification data, and test data include Hold-out, Cross Validation, and Leave One Out.

[Step S005]

Step S005 is a step of determining whether the learning of the identification model is terminated.

The learning may be terminated at the time when a predetermined number of times is reached. Alternatively, the learning may be terminated at the time when the accuracy rate exceeds a predetermined threshold value. Further alternatively, the learning may be terminated at the time when the accuracy rate is saturated to some extent. Note that a constant is preferably prepared in advance for the number of times or the threshold value. Alternatively, a user may specify the timing when the learning is terminated during the learning.

In the case where the learning is determined to be terminated (YES), the process proceeds to Step S006.

In the case where the learning is determined not to be terminated (NO), the process proceeds to Step S002. In other words, the image data 12_1 to the image data 12_p contained in the learning data set are generated for each learning. This can shorten the time taken for learning and improve the accuracy rate, for example.

By the above-described learning, a learned identification model is generated.

[Step S006]

Step S006 is a step of outputting the learned identification model generated in Step S004.

The above has described the example of the method for generating a learned identification model. By using the method for generating learning data, which is one embodiment of the present invention, learning data is generated and a learning data set containing the learning data is generated. Learning of an identification model is performed on the basis of the learning data set, whereby an identification model with high accuracy of defect identification can be generated.

<Method for Identifying Defect>

A method for identifying a defect, which is one embodiment of the present invention, is described.

Figure 7:
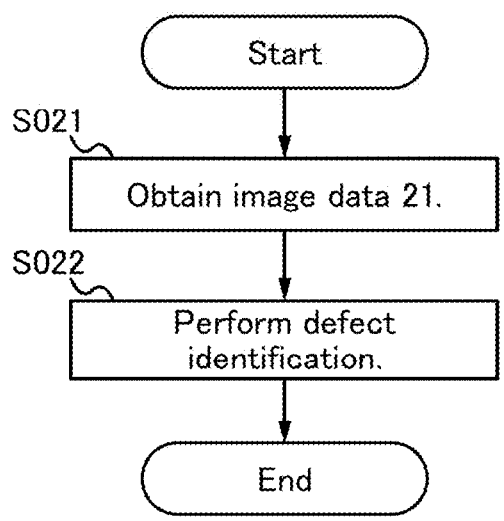
FIG. 7 is a flow chart illustrating a method for identifying a defect.

FIG. 7 is a flow chart illustrating an example of a method for identifying a defect contained in image data. FIG. 7 is also a flow chart explaining the flow of processing executed by an identification device.

The method for identifying a defect contained in image data includes Step S021 and Step S022 as illustrated in FIG. 7.

[Step S021]

Step S021 is a step of obtaining image data 21. Note that the number of pieces of image data 21 is not limited to one and may be more than one.

The image data 21 is image data containing a defect. Note that the defect contained in the image data 21 is not identified. In other words, the image data 21 is not labeled. Thus, the image data 21 is image data to be identified.

[Step S022]

Step S022 is a step of evaluating the image data 21. In other words, Step S022 is a step of identifying the defect contained in the image data 21. To identify the defect, the learned identification model output in Step S006 is preferably used.

When the image data 21 is input to the identification model, an output value is obtained. The output value is posterior probability and is used to identify the defect. The defect is identified on the basis of the output value.

The above has described the example of the method for identifying a defect contained in image data. Using the learned identification model generated in Step S006 enables accurate defect identification.

One embodiment of the present invention can provide a method for generating learning data. Another embodiment of the present invention can provide a method for generating a learned identification model. Another embodiment of the present invention can provide a method for identifying a defect.

This embodiment can be combined with any of another embodiment and Example as appropriate. In the case where a plurality of structure examples are described in one embodiment in this specification, the structure examples can be combined as appropriate.

Embodiment 2

In this embodiment, a defect identification system, which is one embodiment of the present invention, will be described with reference to FIG. 8A, FIG. 8B, FIG. 9A, FIG. 9B, and FIG. 10.

The defect identification system of this embodiment can generate suitable learning data by using the method for generating learning data described in Embodiment 1. The defect identification system of this embodiment can also generate a learned identification model by using the method for generating a learned identification model described in Embodiment 1. The defect identification system of this embodiment can also identify a defect by using the method for identifying a defect described in Embodiment 1.

<Defect Identification System>

The defect identification system, which is one embodiment of the present invention, is described.

The defect identification system can be provided in an information processing device such as a personal computer used by a user. Alternatively, the defect identification system can be provided in a server to be accessed by a client PC via a network.

Figure 8A:
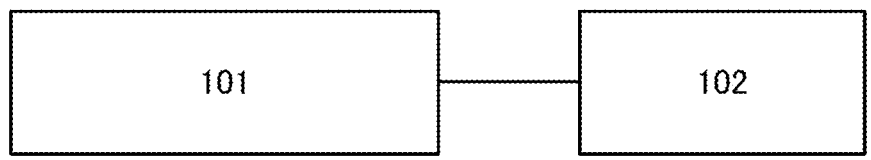
FIG. 8A and FIG. 8B are block diagrams illustrating an example of a defect identification system.

FIG. 8A illustrates an example of the defect identification system, which is one embodiment of the present invention. FIG. 8A illustrates a structure of a defect identification system 100. The defect identification system 100 includes a learning data generation device 101 and an identification device 102 as illustrated in FIG. 8A.

The learning data generation device 101 has a function of generating learning data. The description of <method for generating learning data> or the like can be referred to for the method for generating learning data.

The learning data generation device 101 has a function of generating a learned identification model. The description of <Method for generating learned identification model> or the like can be referred to for the method for generating a learned identification model.

The learning data generation device 101 includes a memory unit (not illustrated in FIG. 8A). The image data 10 and the plurality of pieces of image data 20 are stored in the memory unit. Note that the learning data generated in the learning data generation device 101 may also be stored in the memory unit.

The learning data generation device 101 includes a processing unit (not illustrated in FIG. 8A). Learning data is generated in the processing unit. A learned identification model is also generated.

The learning data generation device 101 may also include an input unit (not illustrated in FIG. 8A). The image data 10 and the plurality of pieces of image data 20 are stored in the memory unit via the input unit. Note that the image data 10 and the plurality of pieces of image data 20 may also be stored in the memory unit via a memory medium, communication, or the like.

The learning data generation device 101 may also include an output unit (not illustrated in FIG. 8A). A learned identification model is supplied from the output unit to the identification device 102. Note that the learned identification model may also be supplied to the identification device 102 via a memory medium, communication, or the like.

The identification device 102 has a function of identifying a defect. The description of <Method for identifying defect> or the like can be referred to for the method for identifying a defect. Note that the identification device 102 may also have a function of evaluating the position of a defect.

The identification device 102 includes a memory unit (not illustrated in FIG. 8A). One or more pieces of image data 21 and a learned identification model are stored in the memory unit.

The identification device 102 includes a processing unit (not illustrated in FIG. 8A). A defect contained in the image data is identified in the processing unit. In addition, the position of the defect contained in the image data is evaluated.

The identification device 102 may also include an input unit (not illustrated in FIG. 8A). One or more pieces of image data 21 and the learned identification model are stored in the memory unit via the input unit. Alternatively, one or more pieces of image data 21 and the learned identification model may be stored in the memory unit via a memory medium, communication, or the like.

The identification device 102 may also include an output unit (not illustrated in FIG. 8A). The output unit has a function of supplying information. The information is the result obtained in the processing unit. The information is, for example, an output value (e.g., posterior probability) corresponding to a defect, or the name and position of an identified defect. The information is supplied as, for example, visual information such as a character string, a numerical value, or a graph, or audio information.

The identification device 102 may also include a display unit (not illustrated in FIG. 8A). The display unit has a function of supplying the information. Examples of the display unit include a display and an output device such as a printer.

In the defect identification system 100, the learning data generation device 101 may be provided in a server and the identification device 102 may be provided in a terminal, for example. Alternatively, the learning data generation device 101 and the identification device 102 may be provided in a single terminal or server.

The defect identification system 100 in which the learning data generation device 101 is provided in a server and the identification device 102 is provided in a terminal is described with reference to FIG. 8B.

Figure 8B:
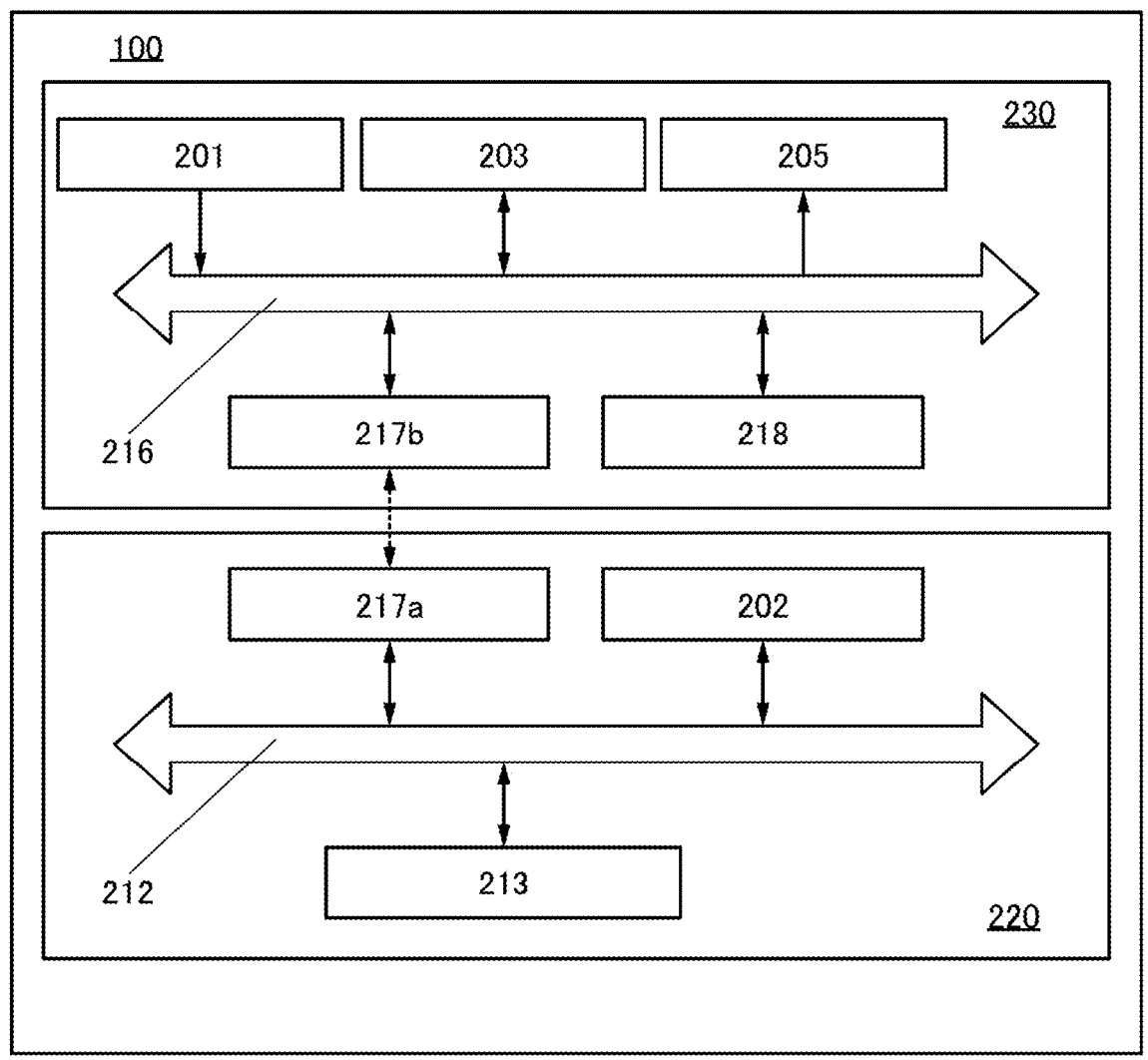

FIG. 8B is a block diagram of the defect identification system 100. Note that in a block diagram attached to this specification, components are classified according to their functions and shown as independent blocks; however, it is practically difficult to completely separate the components according to their functions, and one component may have a plurality of functions. Moreover, one function can relate to a plurality of components; for example, processing of a processing unit 202 can be executed on different servers depending on the processing.

The defect identification system 100 includes a server 220 and a terminal 230. The terminal 230 is, for example, a personal computer.

The server 220 includes a processing unit 202, a transmission path 212, a memory unit 213, and a communication unit 217a. The server 220 may further include an input unit, an output unit, or the like, although not illustrated in FIG. 8B.

The terminal 230 includes an input unit 201, a memory unit 203, a display unit 205, a transmission path 216, a communication unit 217b, and a processing unit 218. The terminal 230 may further include an output unit, a database, or the like, although not illustrated in FIG. 8B.

Image data received by the communication unit 217a is stored in the memory unit 213 via the transmission path 212. Alternatively, the image data may be directly supplied to the processing unit 202 from the communication unit 217a.

Generation of the learning data and generation of the learned identification model, which have been described in the above embodiment or the like, require high processing capability. The processing unit 202 included in the server 220 has higher processing capability than the processing unit 218 included in the terminal 230. Thus, it is preferable that learning data and a learned identification model be generated in the processing unit 202.

Then, a learned identification model is generated by the processing unit 202. The learned identification model is supplied from the processing unit 202 to the communication unit 217a directly or via the transmission path 212. The learned identification model is transmitted from the communication unit 217a of the server 220 to the communication unit 217b of the terminal 230 and is stored in the memory unit 203. Alternatively, the learned identification model may be stored in the memory unit 213 via the transmission path 212.

[Transmission Path 212 and Transmission Path 216]

The transmission path 212 and the transmission path 216 have a function of transmitting data. Data transmission and reception among the processing unit 202, the memory unit 213, and the communication unit 217a can be carried out via the transmission path 212. Data transmission and reception among the input unit 201, the memory unit 203, the display unit 205, the communication unit 217b, and the processing unit 218 can be carried out via the transmission path 216.

[Processing Unit 202 and Processing Unit 218]

The processing unit 202 has a function of performing processing using the data supplied from the memory unit 213, the communication unit 217a, or the like. The processing unit 218 has a function of performing processing using the data supplied from the input unit 201, the memory unit 203, the communication unit 217b, or the like. The processing unit 202 preferably has higher processing capability than the processing unit 218.

A transistor including a metal oxide in its channel formation region may be used in the processing unit 202 and the processing unit 218. The transistor has an extremely low off-state current; therefore, with the use of the transistor as a switch for retaining electric charge (data) that has flowed into a capacitor serving as a memory element, a long data retention period can be ensured. When at least one of a register and a cache memory included in each of the processing unit 202 and the processing unit 218 has such a feature, the processing unit 202 and the processing unit 218 can be operated only when needed, and otherwise can be off while data processed immediately before turning off the processing unit 202 and the processing unit 218 is stored in the memory element. Accordingly, normally-off computing is possible and the power consumption of the defect identification system 100 can be reduced.

In this specification and the like, a transistor including an oxide semiconductor in its channel formation region is referred to as an oxide semiconductor transistor (OS transistor). A channel formation region of an OS transistor preferably includes a metal oxide.

The metal oxide included in the channel formation region preferably contains indium (In). When the metal oxide included in the channel formation region is a metal oxide containing indium, the carrier mobility (electron mobility) of the OS transistor increases. The metal oxide contained in the channel formation region preferably contains an element M. The element M is preferably aluminum (Al), gallium (Ga), or tin (Sn). Other elements that can be used as the element M are boron (B), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements may be used in combination as the element M. The element M is an element having high bonding energy with oxygen, for example. The element M is an element having higher bonding energy with oxygen than indium, for example. The metal oxide contained in the channel formation region preferably contains zinc (Zn). The metal oxide containing zinc is easily crystallized in some cases.

The metal oxide included in the channel formation region is not limited to the metal oxide containing indium. The metal oxide included in the channel formation region may be a metal oxide that does not contain indium and contains zinc, a metal oxide that contains gallium, or a metal oxide that contains tin, e.g., zinc tin oxide or gallium tin oxide.

A transistor including silicon in its channel formation region (Si transistor) may be used in the processing unit 202 and the processing unit 218. A transistor including a semiconductor material having a bandgap such as graphene, silicene, and chalcogenide (transition metal chalcogenide) may also be used in a channel formation region.

In the processing unit 202 and the processing unit 218, a transistor including an oxide semiconductor in its channel formation region and a transistor including silicon in its channel formation region may be used in combination.

The processing unit 202 and the processing unit 218 include, for example, an arithmetic circuit, a central processing unit (CPU), or the like.

The processing unit 202 and the processing unit 218 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing unit 202 and the processing unit 218 can interpret and execute instructions from various programs with the use of a processor to process various types of data and control programs. The programs to be executed by the processor are stored in at least one of a memory region of the processor and the memory unit 203.

The processing unit 202 and the processing unit 218 may include a main memory. The main memory includes at least one of a volatile memory such as a RAM and a nonvolatile memory such as a ROM.

For example, a DRAM (Dynamic Random Access Memory), an SRAM (Static Random Access Memory), or the like is used as the RAM, and a virtual memory space is assigned to be used as a work space for the processing unit 202 and the processing unit 218. An operating system, an application program, a program module, program data, a look-up table, and the like that are stored in the memory unit 203 are loaded into the RAM and executed. The data, program, and program module that are loaded into the RAM are each directly accessed and operated by the processing unit 202 and the processing unit 218.

In the ROM, a BIOS (Basic Input/Output System), firmware, and the like for which rewriting is not needed can be stored. Examples of the ROM include a mask ROM, an OTPROM (One Time Programmable Read Only Memory), and an EPROM (Erasable Programmable Read Only Memory). Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

Note that a product-sum operation is performed in a neural network. When the product-sum operation is performed by hardware, the processing unit 202 and the processing unit 218 preferably include a product-sum operation circuit. A digital circuit may be used or an analog circuit may be used as the product-sum operation circuit. In the case where an analog circuit is used as the product-sum operation circuit, the circuit scale of the product-sum operation circuit can be reduced, or higher processing speed and lower power consumption can be achieved by reduced frequency of access to a memory. Note that the product-sum operation may be performed on software using a program.

The product-sum operation circuit may be configured with a Si transistor or an OS transistor. An OS transistor is particularly suitable for a transistor included in an analog memory of the product-sum operation circuit because of its extremely low off-state current. Note that the product-sum operation circuit may be configured with both a Si transistor and an OS transistor.

[Memory Unit 203]

The memory unit 203 has a function of storing a program to be executed by the processing unit 218. The memory unit 203 has a function of storing a learned identification model generated by the processing unit 202, an arithmetic operation result generated by the processing unit 218, data input to the communication unit 217*b*, data input to the input unit 201, or the like.

The memory unit 203 includes at least one of a volatile memory and a nonvolatile memory. For example, the memory unit 203 may include a volatile memory such as a DRAM or an SRAM. For example, the memory unit 203 may include a nonvolatile memory such as an ReRAM (Resistive Random Access Memory), a PRAM (Phase change Random Access Memory), an FeRAM (Ferroelectric Random Access Memory), an MRAM (Magnetoresistive Random Access Memory), or a flash memory. The memory unit 203 may include storage media drives such as a hard disc drive (HDD) and a solid state drive (SSD).

[Memory Unit 213]

The memory unit 213 has a function of storing a program to be executed by the processing unit 202. The memory unit 213 has a function of storing an identification model, data input to the communication unit 217*a*, or the like. For the memory unit 213, the description of the memory unit 203 can be referred to.

[Communication Unit 217*a* and Communication Unit 217*b*]

The server 220 and the terminal 230 can transmit and receive data with the use of the communication unit 217*a* and the communication unit 217*b*. As the communication unit 217*a* and the communication unit 217*b*, a hub, a router, a modem, or the like can be used. Data may be transmitted or received through wire communication or wireless communication (e.g., radio waves or infrared rays).

Note that communication between the server 220 and the terminal 230 may be performed by connection with a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network).

Note that the structure of the defect identification system 100 is not limited to the above. The server 220 may have some of the functions of the identification device 102 and the terminal 230 may have some of the functions of the learning data generation device 101. For example, the server 220 may have the defect identification function of the identification device 102.

The above has described the defect identification system 100. Note that although the defect identification system 100 illustrated in FIG. 8A includes the learning data generation device 101 and the identification device 102, one embodiment of the present invention is not limited thereto. Variations of the defect identification system 100 will be given below. The variation of the defect identification system given below can be combined with another defect identification system described in this specification and the like as appropriate.

Figure 9A:
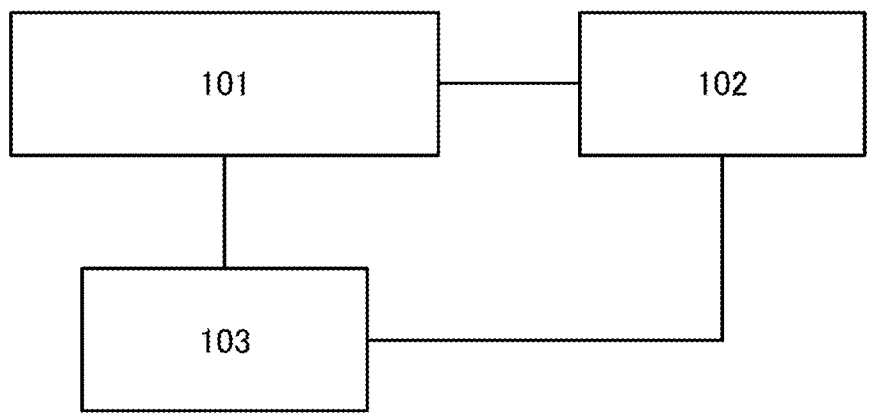
FIG. 9A and FIG. 9B are block diagrams illustrating an example of a defect identification system.

FIG. 9A illustrates a defect identification system 100A that is a variation of the defect identification system 100 illustrated in FIG. 8A. As illustrated in FIG. 9A, the defect identification system 100A may include a database 103 in addition to the learning data generation device 101 and the identification device 102.

The database 103 is connected to the learning data generation device 101 and the identification device 102 via a transmission path.

The transmission path includes, in its category, networks such as a local area network (LAN) and the Internet. For the network, either one or both of wired and wireless communications can be used.

The database 103 stores image data. The image data is image data (e.g., the image data 20 described in the above embodiment) used as learning data, image data (e.g., the image data 21 described in the above embodiment) to be identified, image data (e.g., the image data 10 described in the above embodiment) used to generate learning data, or the like. The image data is stored in the database 103 via the input unit included in the learning data generation device 101, the input unit included in the identification device 102, a memory medium, communication, or the like. In this case, the image data is not necessarily stored in the memory unit included in the learning data generation device 101 or the memory unit included in the identification device 102.

In the defect identification system 100A, the learning data generation device 101 and the database 103 may be provided in a server and the identification device 102 may be provided in a terminal, for example. Alternatively, the learning data generation device 101, the identification device 102, and the database 103 may be provided in a single terminal or server. Further alternatively, the database 103 may be provided in a terminal or server in which the learning data generation device 101 is provided and a terminal or server different from a terminal or server in which the identification device 102 is provided.

The defect identification system 100A in which the learning data generation device 101, the identification device 102, and the database 103 are provided in a single terminal or server is described with reference to FIG. 9B.

Figure 9B:
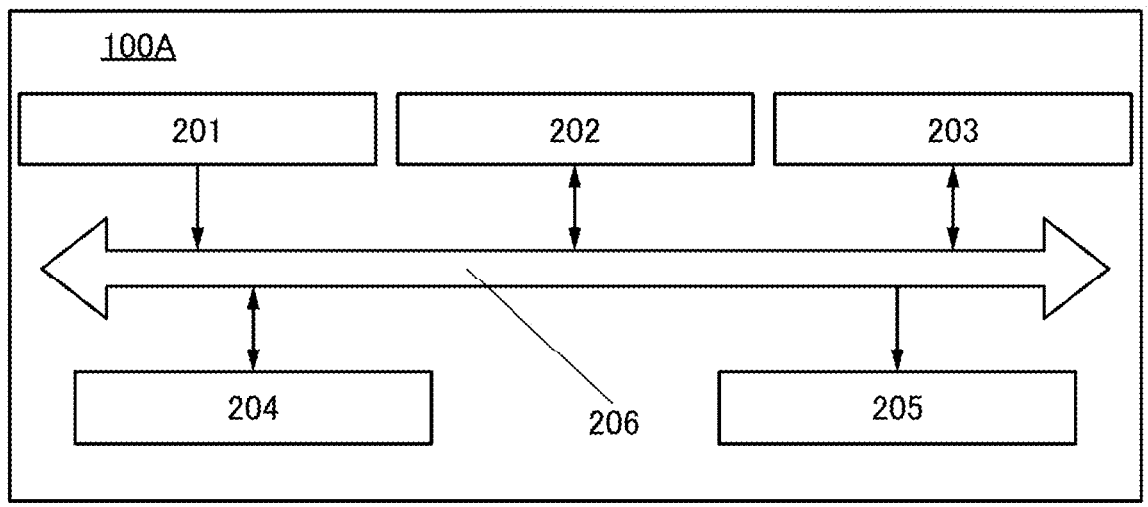

FIG. 9B is a block diagram of the defect identification system 100A.

The defect identification system 100A illustrated in FIG. 9B includes the input unit 201, the processing unit 202, the memory unit 203, a database 204, the display unit 205, and a transmission path 206.

[Input Unit 201]

To the input unit 201, image data is supplied from the outside of the defect identification system 100A. The image data is labeled image data, unlabeled image data, image data used to generate learning data, or the like. Specifically, the image data is image data (e.g., the image data 20 described in the above embodiment) used as learning data, image data (e.g., the image data 21 described in the above embodiment) to be identified, image data (e.g., the image data 10 described in the above embodiment) used to generate learning data, or the like. The image data supplied to the input unit 201 is supplied to the processing unit 202, the memory unit 203, or the database 204 via the transmission path 206.

[Processing Unit 202]

The processing unit 202 has a function of performing processing using the data supplied from the input unit 201, the memory unit 203, the database 204, or the like. The processing unit 202 can supply a processing result to the memory unit 203, the database 204, the display unit 205, or the like.

The processing unit 202 has a function of generating learning data, a function of generating a learned identification model, and a function of identifying a defect.

[Memory Unit 203]

The memory unit 203 has a function of storing a program to be executed by the processing unit 202. The memory unit 203 may have a function of storing, for example, a learned identification model, a processing result generated by the processing unit 202, or data input to the input unit 201. Specifically, the memory unit 203 preferably has a function of storing learning data, a learning data set, a learned identification model, a defect identification result, or the like generated in the processing unit 202.

[Database 204]

The defect identification system 100A includes the database 204. For example, the database 204 has a function of storing the above image data. Note that learning data, a learning data set, a learned identification model, a defect identification result, and the like generated in the processing unit 202 may be stored. In this case, such data is not necessarily stored in the memory unit 203.

Note that the memory unit 203 and the database 204 are not necessarily separated from each other. For example, the defect identification system 100A may include a storage unit that has both the function of the memory unit 203 and that of the database 204.

Note that memories included in the processing unit 202, the memory unit 203, and the database 204 can each be regarded as an example of a non-transitory computer readable storage medium.

[Display Unit 205]

The display unit 205 has a function of displaying a processing result obtained in the processing unit 202. The display unit 205 also has a function of displaying a defect identification result.

[Transmission Path 206]

The transmission path 206 has a function of transmitting a variety of data. The data transmission and reception among the input unit 201, the processing unit 202, the memory unit 203, the database 204, and the display unit 205 can be carried out via the transmission path 206. For example, data such as image data or a learned identification model is transmitted and received via the transmission path 206.

The defect identification system 100A may include an output unit. The output unit has a function of supplying data to the outside.

The above has described the defect identification system 100A.

Figure 10:
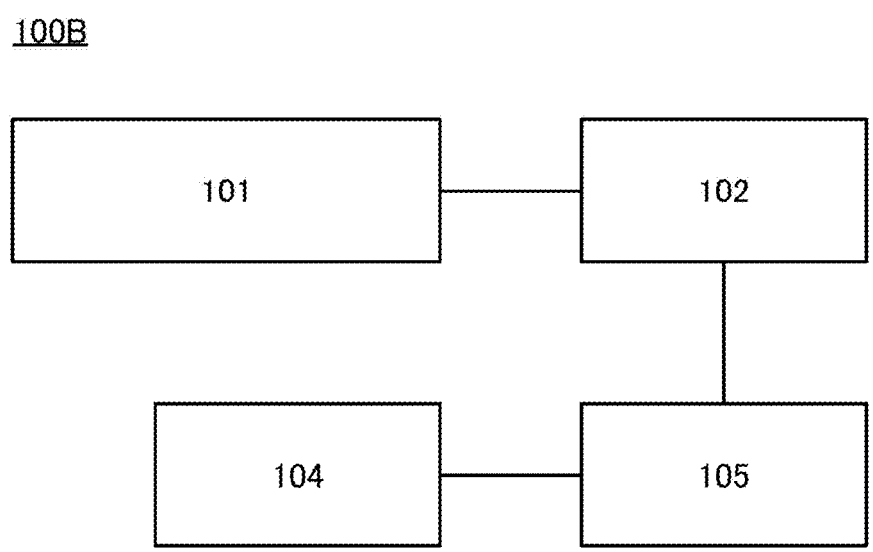
FIG. 10 is a block diagram illustrating an example of a defect identification system.

FIG. 10 illustrates a defect identification system 100B that is a variation of the defect identification system 100 illustrated in FIG. 8A. As illustrated in FIG. 10, the defect identification system 100B may include an imaging device 104 and an inspection device 105 in addition to the learning data generation device 101 and the identification device 102.

The imaging device 104 has a function of capturing an image of a semiconductor element in the middle of the manufacturing process or a semiconductor element whose manufacturing process has been completed. An example of the imaging device 104 is a camera. An image of the semiconductor element is captured, whereby image data in which the presence or absence of a defect has not been determined is obtained. In other words, the image data is image data to be identified. Alternatively, the image data is image data that can be used to generate learning data.

The inspection device 105 has a function of determining whether or not the image data obtained with the imaging device 104 contains a defect. Accordingly, it is possible to determine whether or not the image data contains a defect.

To determine whether or not a defect is contained, the image data to be subjected to determination and the image data obtained in the previous step are compared with each other. For example, a difference between the image data to be determined and the image data obtained in the previous step is obtained. Then, on the basis of the difference, whether or not a defect is contained may be determined.

Note that machine learning may be used to determine whether or not a defect is contained. The number of pieces of image data subjected to the determination of whether or not a defect is contained tends to be enormous. Thus, machine learning can be used to shorten the time required for the determination.

To determine whether or not a defect is contained, a method similar to detection of an abnormal portion can be used, for example. Unsupervised learning is used to detect an abnormal portion in some cases. Thus, unsupervised learning is preferably used for the determination. By using unsupervised learning, it is possible to accurately determine whether or not image data contains a defect even when the number of pieces of image data containing a defect is small.

Note that supervised learning is used to detect an abnormal portion in some cases. Thus, supervised learning may be used also for the determination. Supervised learning makes it possible to accurately determine whether or not a defect is contained.

For the machine learning, a neural network (especially, deep learning) is preferably used.

Image data that has been determined to contain a defect is subjected to identification. Specifically, the image data corresponds to the image data 21 described in Embodiment 1. Thus, the image data is supplied to the identification device 102.

Image data that has been determined not to contain a defect may be used to generate learning data. Specifically, the image data can be used as the image data 10 described in Embodiment 1. In the case where a neural network is used as a function of determining whether or not image data contains a defect, the image data may be used as learning data of the neural network.

By including the imaging device 104 and the inspection device 105, the defect identification system 100B can obtain image data and determine the absence or presence of a defect in addition to generation of learning data, generation of a learned identification model, and defect identification.

The above has described the structures of the defect identification system 100. The defect identification system of one embodiment of the present invention enables accurate defect identification.

One embodiment of the present invention can provide a learning data generation device. One embodiment of the present invention can provide a defect identification system.

This embodiment can be combined with any of another embodiment, Example, and the like as appropriate. In this specification, in the case where a plurality of structure examples are shown in one embodiment, the structure examples can be combined as appropriate.

Example

In this example, results of defect identification obtained using identification models will be described with reference to FIG. 11 and FIG. 12. Specifically, the accuracy rate of defect identification was calculated by preparing a learning data set, generating a learned identification model on the basis of the learning data set, and identifying a defect using the identification model.

First, three learning data sets (a learning data set 1A, a learning data set 2A, and a learning data set 3A) were generated.

The learning data set 1A is composed of only image data containing a defect. In other words, the learning data set 1A is composed of only the plurality of pieces of image data 20.

Figure 11A:
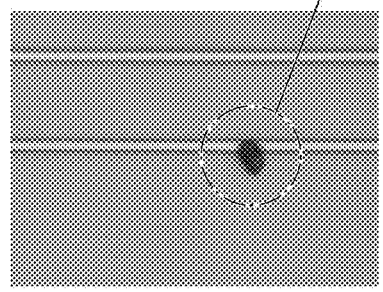
FIG. 11A to FIG. 11I are diagrams showing examples of image data.
Figure 11B:
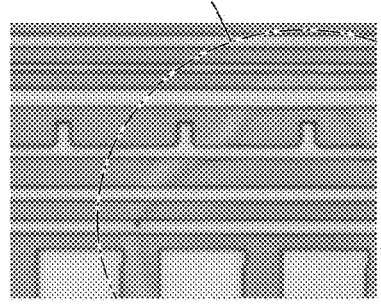
Figure 11C:
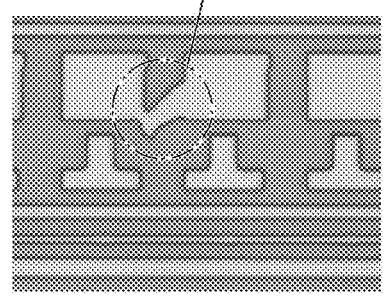

FIG. 11A to FIG. 11C show examples of the plurality of pieces of image data 20. FIG. 11A shows the image data 20_1 in which contamination with foreign matter 41A_1 has been confirmed. FIG. 11B shows the image data 202 in which film loss 41B_1 has been confirmed. FIG. 11C shows the image data 20_3 in which a defective pattern 41C_1 has been confirmed.

A label corresponding to foreign matter is assigned to the image data 20_1. A label corresponding to film loss is assigned to the image data 20_2. A label corresponding to a defective pattern is assigned to the image data 20_3.

For the learning data set 1A, 600 pieces of image data 20 were prepared. Note that the learning data set 1A was divided into 300 pieces of learning data and 300 pieces of verification data.

The learning data set 2A is composed of image data containing a defect and image data containing a pseudo defect that was generated by the method for generating learning data of one embodiment of the present invention. In other words, the learning data set 2A is composed of the plurality of pieces of image data 20 and the plurality of pieces of image data 12.

Figure 11D:
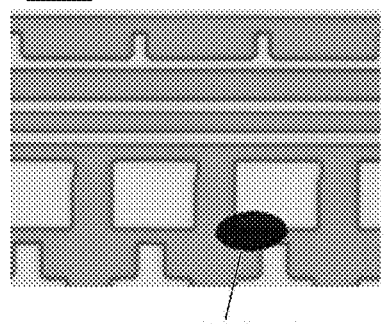
Figure 11E:
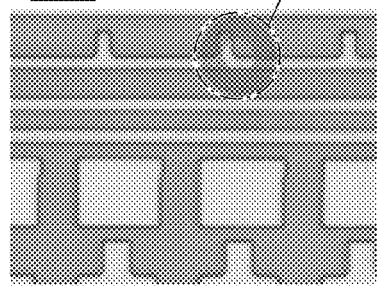
Figure 11F:
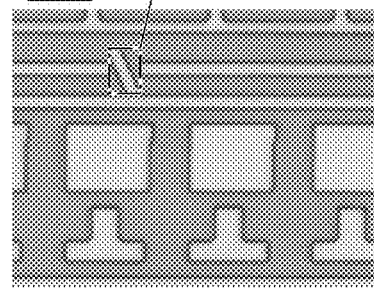

FIG. 11D to FIG. 11F show examples of the plurality of pieces of image data 12. FIG. 11D shows the image data 12_1 obtained by combining an ellipse 31A1_1 that is a pseudo defect. FIG. 11E shows the image data 12_2 obtained by combining a double ellipse 31B_1 that is a pseudo defect. FIG. 11F shows the image data 12_3 obtained by combining a second polygon 31C_1 that is a pseudo defect.

A label corresponding to foreign matter is assigned to the image data 12_1. A label corresponding to film loss is assigned to the image data 12_2. A label corresponding to a defective pattern is assigned to the image data 12_3.

For the learning data set 2A, 600 pieces of image data 20 and 10000 pieces of image data 12 were prepared. Note that the learning data set 2A was divided into learning data and verification data. The learning data is composed of 300 pieces of image data 20 and 10000 pieces of image data 12. The verification data is composed of 300 pieces of image data 20 that were not used as the learning data.

A learning data set 3A, which is a comparative example, is composed of image data containing a defect and image data containing a pseudo defect that was generated without using the method for generating learning data of one embodiment of the present invention. In other words, the learning data set 3A is composed of the plurality of pieces of image data 20 and a plurality of pieces of image data 13.

The image data 13 is image data containing a two-dimensional graphic 42. Note that the two-dimensional graphic 42 is a two-dimensional graphic generated without using the method for generating learning data of one embodiment of the present invention. In other words, the two-dimensional graphic 42 is a two-dimensional graphic that cannot be generated by the method for generating learning data of one embodiment of the present invention. In other words, the shape and/or color of the two-dimensional graphic 42 is/are different from the shape and/or color of a two-dimensional graphic that can be generated by the method for generating learning data of one embodiment of the present invention (the two-dimensional graphic that can be generated in Step S012 described in the above embodiment).

Figure 11G:
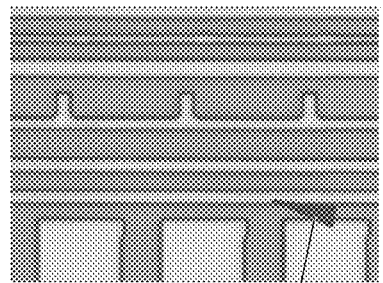
Figure 11H:
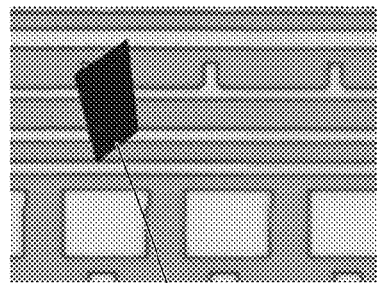
Figure 11I:

FIG. 11G to FIG. 11I show examples of the plurality of pieces of image data 13. FIG. 11G shows image data 13_1 obtained by combining a two-dimensional graphic 42_1 that is a pseudo defect. FIG. 11H shows image data 13_2 obtained by combining a two-dimensional graphic 42_2 that is a pseudo defect. FIG. 11I shows image data 13_3 obtained by combining a two-dimensional graphic 42_3 that is a pseudo defect.

A label corresponding to foreign matter is assigned to the image data 13_1. A label corresponding to film loss is assigned to the image data 13_2. A label corresponding to a defective pattern is assigned to the image data 13_3.

The two-dimensional graphic 42_1 differs from a two-dimensional graphic representing foreign matter that can be generated by the method for generating learning data of one embodiment of the present invention. For example, the color of the two-dimensional graphic 42_1 differs from the color of the first polygon 31A2. Specifically, the grayscale values of the two-dimensional graphic 42_1 are 255 for R and 0 for G and B.

The two-dimensional graphic 42_2 differs from a two-dimensional graphic representing film loss that can be generated by the method for generating learning data of one embodiment of the present invention. For example, the shape and color of the two-dimensional graphic 42_2 differ from the shape and color of the double ellipse 31B. Specifically, the two-dimensional graphic 42_2 is a quadrangle. The grayscale values of the two-dimensional graphic 42_2 are 0 for R and G and 255 for B.

The two-dimensional graphic 423 differs from a two-dimensional graphic representing a defective pattern that can be generated by the method for generating learning data of one embodiment of the present invention. For example, the shape and color of the two-dimensional graphic 423 differ from the shape and color of the second polygon 31C. Specifically, the two-dimensional graphic 423 is an ellipse. The grayscale value of the two-dimensional graphic 423 is 0 for each of R, G, and B.

For the learning data set 3A, 600 pieces of image data 20 and 10000 pieces of image data 13 were prepared. Note that the learning data set 3A was divided into learning data and verification data. The learning data is composed of 300 pieces of image data 20 and 10000 pieces of image data 12. The verification data is composed of 300 pieces of image data 20 that were not used as the learning data.

Learning of an identification model was performed on the basis of the learning data set TA. The identification model is referred to as an identification model 1B. Learning of an identification model was performed on the basis of the learning data set 2A. The identification model is referred to as an identification model 2B. Learning of an identification model was performed on the basis of the learning data set 3A. The identification model is referred to as an identification model 3B.

Then, the identification model 1B, the identification model 2B, and the identification model 3B were used to perform defect identification using test data. As the test data, 300 pieces of image data 20 were prepared.

Figure 12:
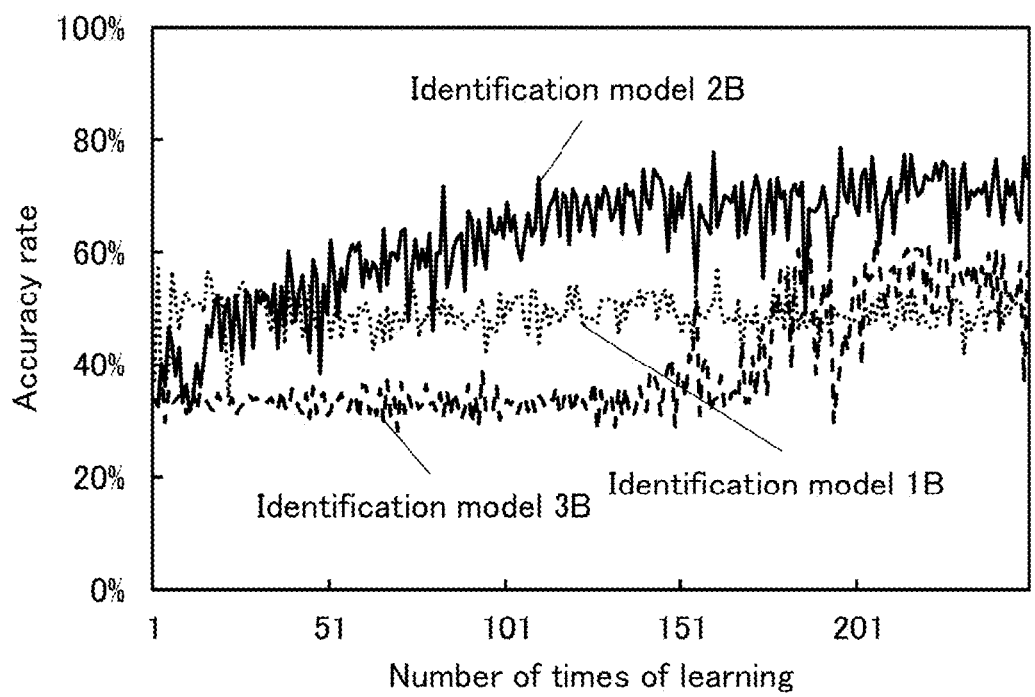
FIG. 12 is a diagram showing a change in accuracy rate of each identification model.

FIG. 12 shows changes in accuracy rates of defect identification. The dotted line in FIG. 12 represents the accuracy rates of defect identification relative to the number of times of learning of the identification model 1B. The solid line in FIG. 12 represents the accuracy rates of defect identification relative to the number of times of learning of the identification model 2B. The dashed line in FIG. 12 represents the accuracy rates of defect identification relative to the number of times of learning of the identification model 3B.

According to FIG. 12, at the number of times of learning where the accuracy rates are saturated to some extent (specifically, 100th and subsequent learning), the identification model 2B has a higher accuracy rate than the identification model 1B. This suggests that the learning data set 2A used for learning of the identification model 2B is a learning data set subjected to appropriate data augmentation. Thus, the image data 12 included in the learning data set 2A enables accurate defect identification.

According to FIG. 12, at the number of times of learning where the accuracy rates are saturated to some extent (specifically, 200th and subsequent learning), the identification model 3B has an accuracy rate substantially equal to that of the identification model 1B. This suggests that the learning data set 3A used for learning of the identification model 3B is a learning data set not subjected to appropriate data augmentation.

As described above, the learning data generated by the method for generating learning data of one embodiment of the present invention enables accurate defect identification.

This example can be implemented in combination with any of the structures described in another embodiment and the like, as appropriate.

REFERENCE NUMERALS

10: image data, 10s: range, 11: image data, 11_i: image data, 11_p: image data, 11_1: image data, 11s: range, 11t: image data, 12: image data, 12_i: image data, 12_p: image data, 12_1: image data, 12_2: image data, 12_3: image data, 12A1: image data, 12A2: image data, 12B: image data, 12C: image data, 13: image data, 13_1: image data, 13_2: image data, 13_3: image data, 20: image data, 20_j: image data, 20_q: image data, 20_1: image data, 20_2: image data, 20_3: image data, 21: image data, 31_i: two-dimensional graphic, 31_p: two-dimensional graphic, 31_1: two-dimensional graphic, 31A_1: ellipse, 31A1: ellipse, 31A2: first polygon, 31B: double ellipse, 31B_1: double ellipse, 31C: second polygon, 31C_1: second polygon, 41A_1: foreign matter, 41B_1: film loss, 41C_1: defective pattern, 42: two-dimensional graphic, 42_1: two-dimensional graphic, 42_2: two-dimensional graphic, 42_3 two-dimensional graphic, 100: defect identification system, 100A: defect identification system, 100B: defect identification system, 101: learning data generation device, 102: identification device, 103: database, 104: imaging device, 105: inspection device, 201: input unit, 202: processing unit, 203: memory unit, 204: database, 205: display unit, 206: transmission path, 212: transmission path, 213: memory unit, 216: transmission path, 217a: communication unit, 217b: communication unit, 218: processing unit, 220: server, 230: terminal

The invention claimed is:

1. A learning data generation device comprising:
a memory unit; and
a processing unit,
wherein the memory unit is configured to store first image data,
wherein the processing unit is configured to cut out part of the first image data obtained by capturing only an area with a normal pattern as second image data,
wherein the processing unit is configured to generate a two-dimensional graphic corresponding to an area of the second image data and representing a pseudo defect,
wherein the processing unit is configured to generate third image data by combining the second image data and the two-dimensional graphic,
wherein the processing unit is configured to assign a label corresponding to the two-dimensional graphic to the third image data,
wherein the two-dimensional graphic is a first two-dimensional graphic or a second two-dimensional graphic,
wherein the first two-dimensional graphic is generated by specifying shape and color,
wherein the second two-dimensional graphic is generated by cutting out the second image data,
wherein the second two-dimensional graphic is a second polygon, and
wherein the processing unit is configured to assign a third label to the third image data generated by combining the second image data and the second polygon.

2. The learning data generation device according to claim 1,
wherein the first two-dimensional graphic is a first polygon, an ellipse, or a double ellipse,
wherein the processing unit is configure to assign a first label to the third image data generated by combining the second image data and the first polygon or the ellipse, and
wherein the processing unit is configure to assign a second label to the third image data generated by combining the second image data and the double ellipse.

3. The learning data generation device according to claim 2,
wherein the first polygon comprises a first vertex to an n-th vertex,
wherein n is an integer of 3 or more and 8 or less,
wherein a length of a line segment connecting a point in the first polygon and each of the first vertex to the n-th vertex is a length following a normal distribution,
wherein a mean of the normal distribution is 0.05 times or more and 0.25 times or less a length of a long side of the second image data and a standard deviation of the normal distribution is 0.2 times the mean,
wherein each of R, G, and B of the first polygon is 0 or more and 20 or less (decimal notation) when represented by 256 shades of gray, and
wherein the color of the first polygon has a transmittance of 0% or more and 10% or less.

4. The learning data generation device according to claim 2, wherein a major diameter of the ellipse is 0.05 times or more and 0.25 times or less the length of the long side of the second image data, wherein a minor diameter of the ellipse is 0.6 times or more and 1.0 times or less the major diameter of the ellipse, wherein each of R, G, and B of the ellipse is 0 or more and 10 or less (decimal notation) when represented by 256 shades of gray, and wherein the color of the ellipse has a transmittance of 0% or more and 10% or less.

5. The learning data generation device according to claim 2, wherein a major diameter of the double ellipse is 0.05 times or more and 0.25 times or less the length of the long side of the second image data, wherein a minor diameter of the double ellipse is 0.6 times or more and 1.0 times or less the major diameter of the double ellipse, wherein a difference between an outer diameter and an inner diameter of the double ellipse is 5 pixels or more and 15 pixels or less, wherein R of the double ellipse is 150 or more and 170 or less (decimal notation), G is 60 or more and 80 or less (decimal notation), and B is 20 or more and 40 or less (decimal notation) when represented by 256 shades of gray, and wherein the color of the double ellipse has a transmittance of 50% or more and 75% or less.

6. The learning data generation device according to claim 1, wherein the second polygon is a quadrangle cut out from the second image data rotated around a point positioned in the second image data at an angle of 30° or more and 150° or less, and wherein a center of gravity of the quadrangle is the point and each of a long side and a short side of the quadrangle is 0.1 times or more and 0.25 times or less the length of the long side of the second image data.

7. The learning data generation device according to claim 1, wherein the processing unit is configured to perform gamma conversion on the third image data; and wherein the processing unit is configured to perform noise addition or blurring processing on the third image data.

8. A defect identification system comprising:
the learning data generation device;
a database; and
an identification device,
wherein the learning data generation device is configured to cut out part of the first image data obtained by capturing only an area with a normal pattern as second image data,
wherein the learning data generation device is configured to generate a two-dimensional graphic corresponding to an area of the second image data and representing a pseudo defect,
wherein the learning data generation device is configured to generate third image data by combining the second image data and the two-dimensional graphic,
wherein the learning data generation device is configured to assign a label corresponding to the two-dimensional graphic to the third image data,
wherein the first image data, fourth labeled image data, and fifth unlabeled image data are stored in the database,
wherein the identification device is configured to identify a defect contained in the fifth image data on a basis of a learned model,
wherein the two-dimensional graphic is a first two-dimensional graphic or a second two-dimensional graphic,
wherein the first two-dimensional graphic is generated by specifying shape and color,
wherein the second two-dimensional graphic is generated by cutting out the second image data,
wherein the second two-dimensional graphic is a second polygon, and
wherein the processing unit is configured to assign a third label to the third image data generated by combining the second image data and the second polygon.

9. The defect identification system according to claim 8, wherein the learned model is generated on a basis of a learning data set comprising the third image data and the fourth image data.

* * * * *